United States Patent
George et al.

(10) Patent No.: US 10,348,514 B2
(45) Date of Patent: Jul. 9, 2019

(54) MESH OVER-THE-AIR (OTA) DRIVER UPDATE USING SITE PROFILE BASED MULTIPLE PLATFORM IMAGE

(71) Applicant: ABL IP HOLDING LLC, Conyers, GA (US)

(72) Inventors: Sajin George, Somerville, MA (US); Emanuel Paul Malandrakis, Boston, MA (US); Kenneth Young, Conyers, GA (US); Maarten Lepelaars, Eindhoven (NL)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

(21) Appl. No.: 15/334,768

(22) Filed: Oct. 26, 2016

(65) Prior Publication Data

US 2018/0115435 A1    Apr. 26, 2018

(51) Int. Cl.

| | |
|---|---|
| *H04W 4/06* | (2009.01) |
| *H04L 12/24* | (2006.01) |
| *H04L 12/26* | (2006.01) |
| *H04L 12/28* | (2006.01) |
| *H04L 12/46* | (2006.01) |
| *H04W 84/18* | (2009.01) |

(Continued)

(52) U.S. Cl.
CPC ...... *H04L 12/2814* (2013.01); *G05B 19/0426* (2013.01); *H04L 12/4625* (2013.01); *H04L 41/082* (2013.01); *H04W 4/06* (2013.01); *H05B 33/0845* (2013.01); *H05B 33/0857* (2013.01); *H05B 37/0272* (2013.01); *G05B 2219/23153* (2013.01); *H04L 43/10* (2013.01); *H04W 84/18* (2013.01)

(58) Field of Classification Search
CPC .............. H04L 12/2814; H04L 41/082; G05B 19/0426
USPC ........................................................ 370/338
See application file for complete search history.

(56) References Cited

U.S. PATENT DOCUMENTS

| | | |
|---|---|---|
| 5,280,630 A | 1/1994 | Wang |
| 7,200,130 B2 | 4/2007 | Forstadius |

(Continued)

OTHER PUBLICATIONS

International Search Report and Written Opinion of the International Searching Authority for International Application No. PCT/US2017/037012, dated Aug. 15, 2017, 11 pages.

(Continued)

*Primary Examiner* — Peter G Solinsky
(74) *Attorney, Agent, or Firm* — RatnerPrestia

(57) ABSTRACT

A lighting system includes lighting devices and an update manager. The lighting devices include various hardware versions and/or functionalities. The lighting devices are queried to determine existing hardware versions and/or functionalities. The query is sent via a wireless mesh network of the lighting system. An Over-The-Air (OTA) update includes multiple different lighting device programming images, where each image corresponds to one of the existing hardware versions and/or functionalities. The OTA update is delivered via point-to-point connections between the update manager and some number of lighting devices and/or between the lighting devices. Upon receipt, individual lighting devices determine whether a lighting device programming image is needed and/or which of the lighting device programming images is appropriate.

19 Claims, 10 Drawing Sheets

(51) Int. Cl.
*H05B 33/08* (2006.01)
*H05B 37/02* (2006.01)
*G05B 19/042* (2006.01)

(56) References Cited

U.S. PATENT DOCUMENTS

| | | | |
|---|---|---|---|
| 7,539,488 B2 | 5/2009 | Friedman | |
| 7,627,746 B1 | 12/2009 | Pulleyn et al. | |
| 8,024,723 B2 | 9/2011 | Nahm | |
| 8,035,320 B2 | 10/2011 | Sibert | |
| 8,320,302 B2 | 11/2012 | Richeson | |
| 8,631,239 B2 | 1/2014 | Djabarov et al. | |
| 8,893,109 B2 | 11/2014 | Birtwhistle | |
| 8,924,950 B2 * | 12/2014 | McDonald | G06F 8/65 709/203 |
| 8,984,502 B2 | 3/2015 | Culter | |
| 9,066,404 B2 | 6/2015 | Paolini et al. | |
| 9,165,456 B2 | 10/2015 | Grady | |
| 9,270,529 B2 | 2/2016 | Jacob | |
| 9,711,047 B1 | 7/2017 | Knas et al. | |
| 9,711,048 B1 | 7/2017 | Knas et al. | |
| 9,721,451 B1 | 8/2017 | Knas et al. | |
| 9,741,237 B1 | 8/2017 | Knas et al. | |
| 9,877,266 B1 | 1/2018 | Knas et al. | |
| 9,877,298 B1 | 1/2018 | Knas et al. | |
| 9,881,484 B1 | 1/2018 | Knas et al. | |
| 9,949,091 B1 | 4/2018 | Knas et al. | |
| 9,984,556 B1 | 5/2018 | Knas et al. | |
| 2011/0288658 A1 | 11/2011 | Walters et al. | |
| 2012/0008959 A1 | 1/2012 | Son et al. | |
| 2012/0013508 A1 | 1/2012 | Bao et al. | |
| 2012/0136485 A1 | 5/2012 | Weber | |
| 2012/0173857 A1 | 7/2012 | Kobraei et al. | |
| 2013/0205288 A1 | 8/2013 | Sohm | |
| 2013/0293877 A1 | 11/2013 | Ramer et al. | |
| 2014/0123123 A1 | 5/2014 | Bahls | |
| 2015/0142945 A1 | 5/2015 | Brandt et al. | |
| 2015/0147067 A1 | 5/2015 | Ryan | |
| 2015/0245182 A1 * | 8/2015 | Scagnol | H04L 43/065 370/312 |
| 2015/0256401 A1 | 9/2015 | Zinger et al. | |
| 2015/0373556 A1 | 12/2015 | Oren-Pines | |
| 2015/0373815 A1 | 12/2015 | Patton | |
| 2016/0081160 A1 | 3/2016 | Vangeel et al. | |
| 2016/0085538 A1 | 3/2016 | Finch | |
| 2016/0216957 A1 | 7/2016 | Yoon | |
| 2017/0013663 A1 | 1/2017 | Bora et al. | |
| 2017/0064490 A1 * | 3/2017 | Jin | H04W 4/008 |
| 2017/0123390 A1 | 5/2017 | Barco et al. | |
| 2017/0251488 A1 | 8/2017 | Urban et al. | |

OTHER PUBLICATIONS

Final Office Action for U.S. Appl. No. 15/196,688, dated Jun. 20, 2018, 26 pages.
Notice of Allowance for U.S. Appl. No. 15/196,688, dated Sep. 24, 2018, 17 pages.
Canadian Office Action for Application No. 2,982,946, dated Aug. 3, 2018, 5 pages.
Non Final Office Action for U.S. Appl. No. 15/196,688, dated Jan. 19, 2018, 33 pages.
International Search Report and Written Opinon for International Application No. PCT/US2017/058268, dated Jan. 4, 2018, 13 pages.

* cited by examiner

✓ = will advertise packet
◉ = consumes packet
✗ = kills packet

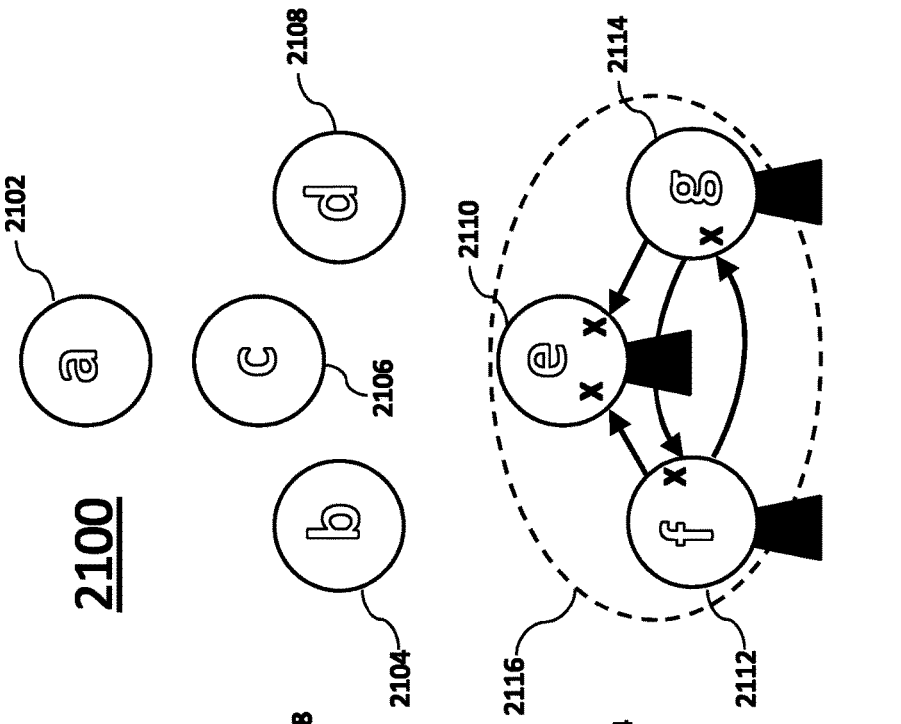
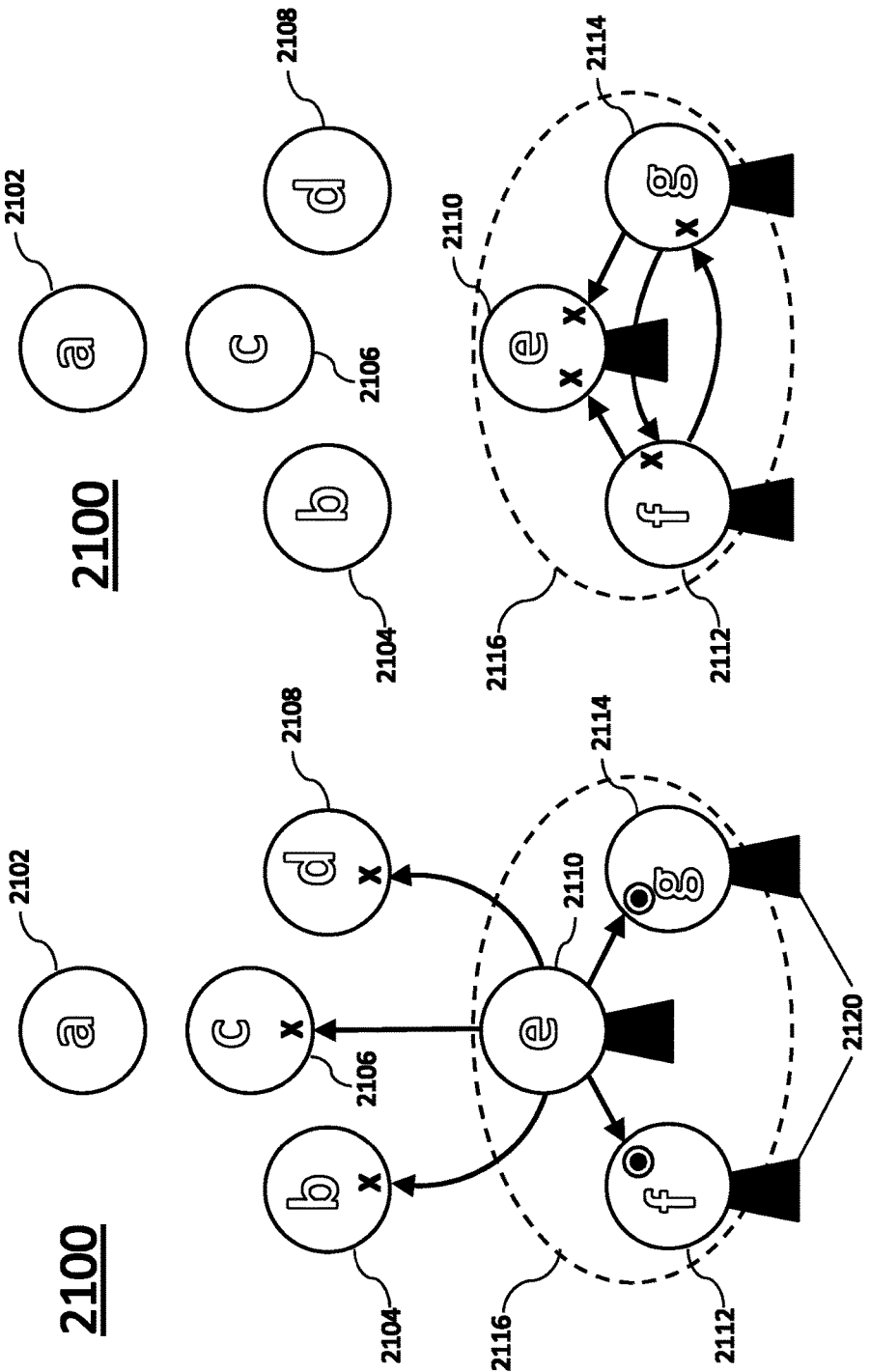

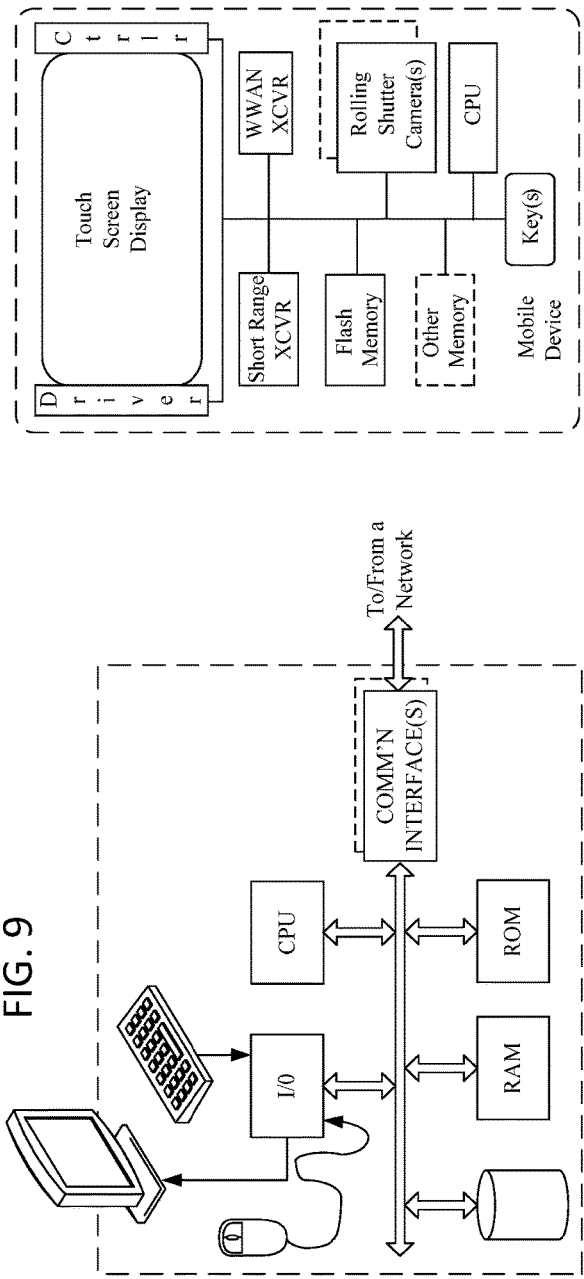
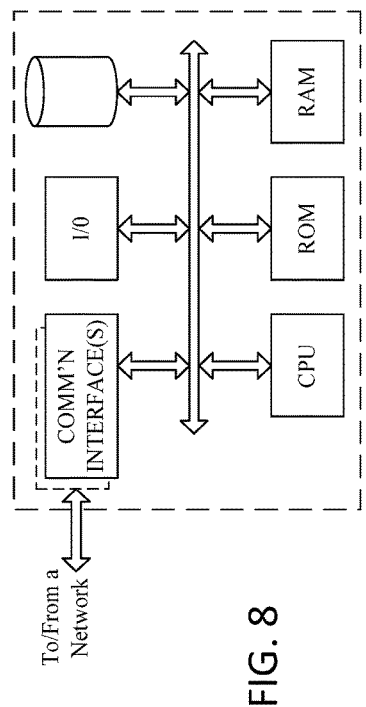
FIG. 10
FIG. 9
FIG. 8

MESH OVER-THE-AIR (OTA) DRIVER UPDATE USING SITE PROFILE BASED MULTIPLE PLATFORM IMAGE

TECHNICAL FIELD

The examples discussed below relate to techniques and equipment to determine various versions of lighting devices or luminaires installed within a site and deliver a consolidated over-the-air (OTA) firmware update containing firmware images corresponding to each of the versions installed within the site.

BACKGROUND

Traditional lighting devices have tended to be relatively dumb, in that they can be turned ON and OFF, and in some cases may be dimmed, usually in response to user activation of a relatively simple input device. Lighting devices have also been controlled in response to ambient light detectors that turn on a light only when ambient light is at or below a threshold (e.g. as the sun goes down) and in response to occupancy sensors (e.g. to turn on light when a room is occupied and to turn the light off when the room is no longer occupied for some period). Often traditional lighting devices are controlled individually or as relatively small groups at separate locations.

With the advent of modern electronics has come advancements, including advances in the types of light sources as well as advancements in networking and control capabilities of the lighting devices. For example, solid state sources are now becoming a commercially viable alternative to traditional light sources such as incandescent and fluorescent lamps. By nature, solid state light sources such as light emitting diodes (LEDs) are easily controlled by electronic logic circuits or processors. Electronic controls have also been developed for other types of light sources. As increased processing capacity finds its way into the lighting devices, it becomes relatively easy to incorporate associated communications capabilities, e.g. to allow lighting devices to communicate with system control elements and/or with each other. In this way, advanced electronics in the lighting devices as well as the associated control elements have facilitated more sophisticated lighting control algorithms as well as increased networking of lighting devices.

For example, in recent years, a number of techniques have been proposed and several systems have been developed and deployed for using visual light communication (VLC) from lighting devices to provide information to mobile devices, to allow the mobile devices to determine estimates of their respective positions in a venue illuminated by the lighting devices. There are advantages of VLC or other light based positioning over other mobile device position determination technologies, particularly for indoor position determinations. For example, optical techniques often are more accurate and/or reliable than other approaches; since light waves are highly directional and do not pass through most materials, therefore a light-detecting device can be presumed proximate to a light source if the source is robustly detectable. Also, as another example of an advantage, optical position estimation may be implemented at indoor facilities for many desirable indoor location based service applications, where signals from global position system (GPS) satellites may be attenuated or blocked to a degree that does not permit sufficiently fast or accurate determinations.

However, traditional approaches to maintaining and updating firmware of these more sophisticated and network enabled lighting devices tend to be manually intensive. Furthermore, an installation may include fixtures having different hardware and/or software versions (e.g., fixture 1 is one hardware version and fixture 2 is another hardware version). In one approach, for example, a technician or other individual is required to move throughout an installation and, while in proximity of a lighting device, establish a short-range radio frequency (RF) connection with the lighting device via a handheld device (e.g., smartphone or other mobile device) in order to determine a version of the lighting device and to deliver corresponding updated firmware to the lighting device. In an installation with hundreds or thousands of lighting devices, such approach could take hours or even days and limit the ability to deploy timely updates. Therefore, a need exists for further improvement.

BRIEF DESCRIPTION OF THE DRAWINGS

The drawing figures depict one or more implementations in accordance with the present concepts, by way of example only, not by way of limitations. In the figures, like reference numerals refer to the same or similar elements.

FIG. 6C schematically depicts an illustrative VLC+RF mesh, such as one of the systems of FIGS. 2 and 3, in a third state of packet transmission.

FIG. 6D schematically depicts an illustrative VLC+RF mesh, such as one of the systems of FIGS. 2 and 3, in a fourth state of packet transmission.

FIG. 8 is a simplified functional block diagram of a computer that may be configured as a host or server, for example, to function as either of the servers in the system of FIG. 2 or FIG. 3.

FIG. 9 is a simplified functional block diagram of a personal computer or other work station or terminal device.

FIG. 10 is a simplified functional block diagram of a mobile device.

DETAILED DESCRIPTION

Figure 1A:
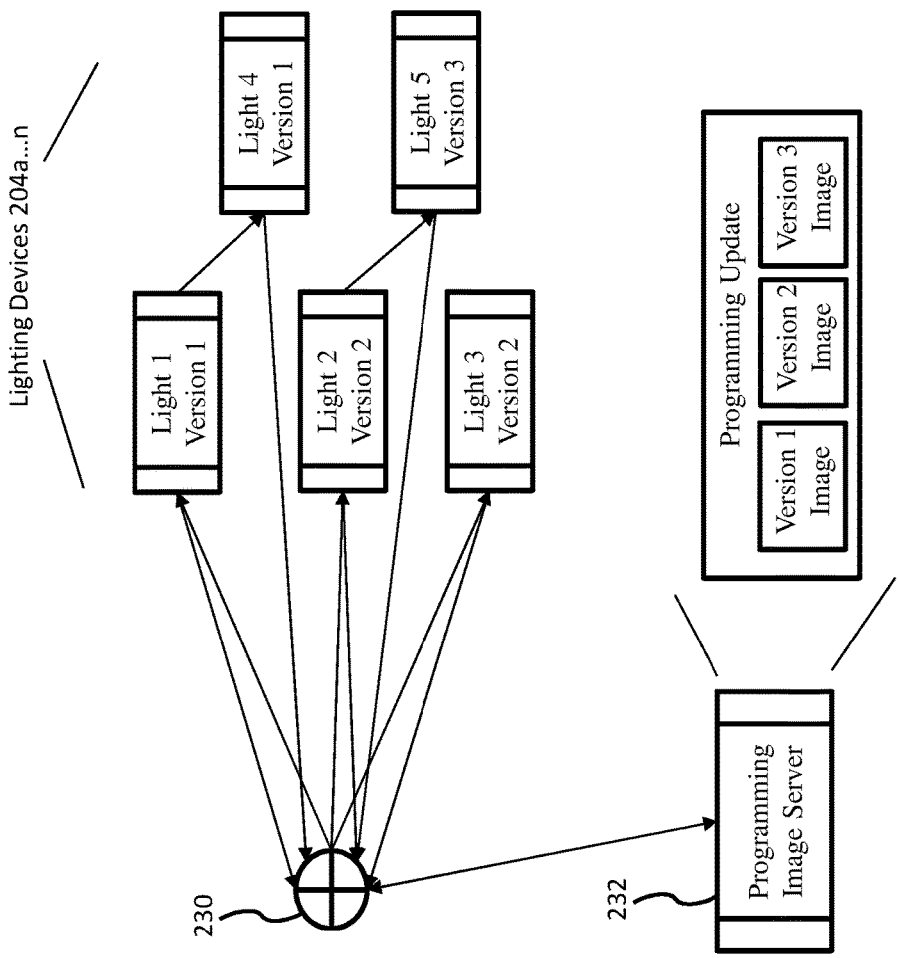
FIG. 1A is a high-level block diagram of an example of a lighting system in which a site profile is created based on responses to a query sent via a wireless mesh and a programming update including programming images based on the site profile is created.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Artificial light generated by intelligent lighting devices or luminaires may be utilized in a number of different situations. In various examples, intelligent lighting devices or luminaires are networked together to form a lighting system network and such networking may incorporate wireless communications. The discussions below concentrate on identifying lighting device versions within a lighting system and creating a firmware update that includes update images corresponding to identified lighting device versions. The lighting system, in one example, includes a variety of different lighting devices and/or different iterations of a lighting device. For example, the lighting system may include a first hardware model of a lighting device and two different iterations/versions of a second hardware model of a lighting device. Furthermore, some lighting devices within the lighting system and the lighting system may include additional components (e.g., an occupancy sensor, a temperature sensor, a camera, a microphone, a control panel, etc.) and these additional components may also vary in hardware model and/or hardware iteration/version. In addition, the lighting devices and additional components each include firmware or other programming that may differ in a version/iteration being executed by otherwise identical devices or components (e.g., one first hardware model lighting device executes a first firmware iteration/version while another first hardware model lighting device executes a second firmware iteration/version). Thus, lighting device version encompasses a hardware model and hardware iteration/version of a lighting device or component. Alternatively, or in addition, lighting device version may encompass a firmware or other programming iteration/version being executed by a lighting device or component. Similarly, lighting device version information, typically provided by an individual lighting device or other stand-alone element within the lighting system, includes an enumeration of corresponding hardware model and hardware iteration/version for the lighting device and any associated component as well as corresponding firmware or other programming iteration/version information.

In the discussions, the lighting devices include RF wireless communication capabilities, particularly wireless mesh capabilities and the wireless mesh is utilized to query the lighting devices and other lighting system elements for lighting device version information. A variety of suitable advanced lighting systems may create a site profile of lighting device versions via a wireless mesh query and utilize the site profile to create a consolidated update including firmware images corresponding to lighting device versions indicated within the site profile.

In one example, optical positioning services are implemented by systems and methods whereby the locations of mobile devices and their users are estimated based on codes and/or other information that the mobile devices obtain from processing of light outputs from intelligent lighting devices. Related location based services can provide information or other service capabilities based on the determined estimates of mobile device position.

Over time, enhancements or other improvements to the operations of these intelligent lighting devices or luminaires, such as may be used in light-based positioning systems or other lighting systems, may be introduced in the form of updated firmware or other programming executed by those lighting devices. Such updated firmware or other programming is incorporated into an update image, which may be used to completely replace existing firmware or other programming currently executing or may be applied as a change or revision to the currently executing firmware or other programming. That is, the update image may represent an entire set of firmware or other programming or the update image may represent only changes or revisions to firmware or other programming.

As outlined above, a need exists to efficiently deliver updated firmware or other programming to a variety of different lighting devices within a lighting system.

The term "lighting device" as used herein is intended to encompass essentially any type of device that processes power to generate light, for example, for illumination of a space intended for use of or occupancy or observation, typically by one or more people or other types of living organism that can take advantage of or be affected in some desired manner by the light emitted from the device. A lighting device, for example, may take the form of a lamp, light fixture or other luminaire that incorporates a source, where the source by itself contains no intelligence or communication capability (e.g. LEDs or the like, or lamp ("regular light bulbs") of any suitable type) and an associated modulator and logic circuitry. Alternatively, a fixture or luminaire may be relatively dumb but include a source device (e.g. a "light bulb") that incorporates the logic, communication and modulation capabilities discussed herein. In most examples, the lighting device(s) illuminate a service area to a level useful for a human in or passing through the space, e.g. regular illumination of a room or corridor in a building or of an outdoor space such as a street, sidewalk, parking lot or performance venue. However, it is also possible that one or more lighting devices in or on a particular premises served by a system of lighting devices have other lighting purposes, such as signage for an entrance or to indicate an exit. Of course, the lighting devices may be configured for still other purposes, e.g. to benefit human or non-human organisms or to repel or even impair certain organisms or individuals. The actual source in each lighting device may be any type of artificial light emitting unit.

The term "mobile device" includes all portable devices having a computational capability and a wireless communication capability (e.g., smartphones or other mobile telephones, tablets, wearable computers, portable media players, handheld game players, electronic tags, etc.). Mobile devices that operate with an optical positioning system, such as a VLC system, also include an appropriate optical sensor. Many types of mobile devices are equipped with cameras that may be utilized as the sensor for optical positioning.

In the optical positioning example, optical positioning may be implemented using outdoor lighting devices, indoor lighting devices or a combination of indoor and outdoor lighting devices. For convenience, the examples below are often discussed in terms of an indoor positioning service type application of the technology.

Also, an "indoor" system is a system that provides positioning services and in some cases additional services over any relatively limited area. The area so served may be partly or entirely confined within a building, ship, mine, or other enclosed structure, but is not necessarily so confined. Hence, an "indoor" positioning system may operate partly or wholly in unenclosed spaces, e.g., over a campus, pedestrian mall, fairground, or the like, where such a service area may also include the interiors of one or more enclosures. Moreover, the spaces or areas served by a single system may not all be contiguous (e.g., the system may distinguish between a number of spaces at somewhat separate locations and support navigation between as well as within those spaces). Also, although reference is made primarily to positioning services that discover and utilize information about mobile device locations in flat "areas" over which a two-dimensional coordinate system is appropriate (e.g., the floor space of a store), the technologies discussed below are applicable to systems discovering and utilizing information about mobile device locations in three-dimensional spaces.

A lighting device for light-based code transmission may be a special purpose device for such code transmission deployed essentially to serve as a 'beacon' only. In many deployments, however, it is possible to modulate the light output of a source otherwise used for general, artificial illumination in the space served by a particular lighting device, so as to integrate the 'beacon' like ID code transmission capability with otherwise typical lighting related functions. Also, although much of the discussion below references visual light or VLC, the light based aspects of the positioning system/service may transmit the code(s) using other light wavelengths or frequencies outside the visible region of the light spectrum. In similar fashion, the lighting device may also "beacon" via RF wireless communications capabilities. For example, the lighting device includes a wireless radio frequency transceiver and repeatedly transmits information over a radio frequency for positioning or other purposes.

As discussed in greater detail below, a lighting device includes, for example, "intelligence" or otherwise is an intelligent lighting device. Such "intelligence" is provided, for example, via a central processing unit (CPU), microcontroller, driver or other processor within or otherwise collocated with the lighting device. In addition, firmware or other programming executed by the processor enables the lighting device to perform functions, such as "beaconing" as part of a light-based positioning system as well as dimming and/or other operations of the light source. Over time, however, changes or revisions to the firmware or other programming may be needed. In addition, a variety of different lighting devices may be installed as part of a lighting system within a site. Hence, a firmware image containing changes or revisions for one lighting device version must be selected from among multiple firmware images. One approach to deliver such lighting device version specific changes or revisions requires that a technician or other individual physically approaches each lighting device within a lighting system, identify lighting device version information, select the appropriate firmware image and initiate the update with the selected firmware image from a mobile device via a radio frequency (RF) connection with the lighting device. Such an approach is manually intensive and may require an unacceptable amount of time.

The concepts disclosed herein, for example, may help to reduce the amount of time and human interaction required by enabling an update manager to query the various lighting devices within the lighting system and identify lighting device version information for the installed lighting devices. Based on the identified lighting device version information, the update manager creates a site profile including each lighting device version installed within the site. The site profile is delivered to a programming image server, which creates a consolidated update including a firmware or other programming image for each lighting device version indicated in the site profile. The update manager delivers the consolidated update to some number of the lighting devices. Upon receipt of the update, a lighting device identifies a corresponding firmware or other programming image from within the update, extracts the corresponding image, applies the corresponding firmware or other programming to operations of the lighting device and delivers the update to neighboring lighting devices.

In one example, a mesh procedure is utilized to deliver the query for lighting device version information via mesh networking between the lighting devices. Because the query is delivered via mesh networking, all of the lighting devices may see the query. Furthermore, delivery of the consolidated update between lighting devices utilizes existing RF communications between the updated lighting device and the neighbor devices to be updated. In other words, the update delivery is considered an over-the-air (OTA) update. Successive distribution from updated devices to neighboring devices distributes the consolidated update to all of the lighting devices of the system or at the site. In this way, a single consolidated update is delivered to each lighting device, enabling each lighting device to select and apply only the change or revision appropriate for that lighting device.

For purposes of discussion, the examples shown in several of the drawings and described below relate to systems using lighting devices with ID code-modulated light outputs that also have appropriate RF wireless communication capability. In some cases, the wireless communication capability of the lighting devices may only be used for local communication, e.g. with another device that provides network communication with a server or the like for over-the-air (OTA) update purposes. In other cases, however, the lighting devices form a wireless mesh network that in turn provides network communication with a server or the like for OTA update purposes. By way of example, US Patent Application Publication No. 2015/0147067 A1 to Ryan et al. discloses various implementations of light-based mobile positioning systems that also utilize radio-frequency (RF) wireless communication to/from the lighting devices, aspects of the RF wireless operations (e.g. dynamic changing of the radio-frequency ID code of a wireless node), as well as location based service applications using such systems; and the entire disclosure of that publication is incorporated herein by reference.

The term "coupled" as used herein refers to any logical, physical or electrical connection, link or the like by which signals produced by one system element are imparted to another "coupled" element. Unless described otherwise, coupled elements or devices are not necessarily directly connected to one another and may be separated by intermediate components, elements or communication media that may modify, manipulate or carry the signals.

Reference now is made in detail to the examples illustrated in the accompanying drawings and discussed below. Although some of the discussions below describe the examples in terms of visual or VLC enabled luminaires, it will be appreciated that the examples also apply to other lighting devices having firmware programmed controllers and wireless network communications capabilities as discussed earlier.

FIG. 1A illustrates several lighting devices 204*a* . . . *n* within a lighting system and depicts the progression of an OTA update throughout such a system. Although lighting devices 204*a* . . . *n* are depicted in a grid, this is only for simplicity and such depiction may bear little or no resemblance to physical locations of individual lighting devices at any given installation site. Examples of such a lighting system and lighting devices are discussed in greater detail below in relation to FIGS. 2-5. In addition, various examples of mesh and point-to-point networking that might be utilized as part of an OTA update are described in greater detail below in relation to FIGS. 6A-6D and 7.

As can be seen in FIG. 1A, lighting controller 230 initiates the OTA update by generating a query requesting lighting device version information. Lighting controller 230 is, for example, a server or gateway computer, a designated leader/manager among the lighting devices, a lighting control device, or other computing device that performs management, maintenance and/or other operational control functions within the lighting system. Alternatively, or in addition, the functionality of lighting controller 230 is implemented in software, such as an update manager or other component within a lighting control software system. Although FIG. 1A depicts initiation of the OTA update by controller 230, no such requirement exists and initiation may occur by one of the lighting devices (e.g., based on a manual update of that one device) or some other external source.

Controller 230 initiates the OTA update, for example, by sending a query for lighting device version information via a mesh of RF networking between each of the lighting devices. As described in greater detail below, mesh networking enables a single packet or other set of communications to be delivered throughout a network of nodes, in this example a network of lighting devices, without the source of the packet or other set of communications establishing separate connections with every member of the network. Instead, the packet source establishes connections with and delivers the packet to immediate neighbors, which in turn establish connections with and re-transmit the packet with their immediate neighbors. In the example, the fixtures implement a flooding type mesh for their network communications, particularly those involving the controller. Hence, the query packet is "flooded" throughout the network.

In response to receipt of the query, each lighting device sends lighting device version information back to controller 230. In one example, the response is also sent via the mesh networking. Alternatively, or in addition, an individual point-to-point RF connection is established between a lighting device and controller 230 to deliver the response. As discussed above, lighting device version information includes, for example, a hardware version of the lighting device, a software version of the lighting device, a hardware version for each of one or more components of the lighting device and/or a software version for each of one or more components of the lighting device. In FIG. 1A, for example, light 1 and light 4 both have the same version information, light 2 and light 2 both have the same version information, and light 5 has different version information. Of note, although the example of FIG. 1A depicts a single version for each lighting device, this is only for simplicity. As an alternative example, light 1 may be one hardware version and include a component with a corresponding hardware version such that lighting device version information for light 1 includes two version indications (e.g., an indication of the light version and an indication of the component version). Further in this alternative example, while light 4 may be the same hardware version as light 1 and include a similar component as the component of light 1, the included component may be a different version from the component of light 1. As such, lighting device version information for light 4 would include the same two version indications, but one of the two would have a different value.

Although the various examples discussed herein explicitly refer to lighting devices as receiving and responding to the query, this is only for simplicity. Components associated with a lighting device (e.g., occupancy sensor, microphone, temperature sensor, etc.) may also exist as stand-alone components within a lighting system. Furthermore, a lighting system may include other elements, such as a control panel or wall switch. Each of these stand-along components and/or other elements may execute firmware or other programming that needs to be updated over time. Therefore, the query may be sent such that other stand-alone components and/or other elements receive the query and respond with corresponding version information.

As controller 230 receives each response, controller 230 reviews a site profile to determine whether the received lighting device version information is already included in the site profile. If not, controller 230 adds the version information to the site profile. For example, controller 230 receives a response first from light 1 and, since version 1 is not yet in the site profile, controller 230 adds version 1 to the site profile. However, upon receipt of a response from light 4, controller 230 determines that version 1 is already in the site profile and controller 230 takes no further action with the response from light 4. Similarly, in this example, controller 230 will add version 2 into the site profile upon receipt of a response from light 2 and will add version 3 into the site profile upon receipt of a response from light 5, but will take no action upon subsequent receipt of a response from light 3. In this way, controller 230 creates and maintains a site profile including only lighting device version information for lighting devices installed within a site. However, the profile does uniquely identify versions of all the different devices at the site, typically without duplication (e.g., one version listed in the profile for any number of devices of the same version).

Alternatively, or in addition, the site profile, for example, includes a complete inventory of devices within an installation and the corresponding device version information for each device. That is, the site profile may include not only an indication that version 1, version 2 and version 3 are utilized in the installation, but also an indication that light 1 and light 4 each utilize version 1, that light 2 utilizes version 2, and that light 3 and light 5 each utilize version 3. In this way, the site profile is both an inventory of versions utilized within the installation as well as an inventory of which device utilizes which version.

Once controller 230 has received a response from each lighting device installed within the site and has created the site profile, controller 230 sends the site profile to programming image server 232 as part of a request for a programming update. Programming image server 232 is, for example, a server or other computing device that maintains firmware or other programming images for lighting devices, stand-alone components and/or other elements installed within the lighting system. Each firmware or other programming image contains changes or revisions corresponding to one lighting device version, either as a complete replacement for existing firmware or other programming or as a modification to the existing firmware or other programming. For example, in FIG. 1A, programming image server 232 includes one image corresponding to version 1, one image corresponding to version 2 and one image corresponding to version 3. As mentioned above, FIG. 1A depicts a single version per lighting device only for simplicity. In an alternate example, each lighting device may consist of multiple elements that each have a corresponding version. Furthermore, while one lighting device with multiple elements may be served by a single image (e.g., one processor controls/manages the multiple elements by executing a single image), another lighting device with multiple elements may require multiple images (e.g., one processor controls/manages the lighting device by executing one image and one element requires a different image). Hence, programming image server 232 maintains a plurality of images, some of which may not apply to some of the lighting devices within the site and some of which may not apply to any of the lighting devices within the site.

Upon receipt of the update request, programming image server 232 will create a programming update including only images corresponding to lighting device versions included in the site profile. In FIG. 1A, for example, the programming update includes version 1 image, version 2 image and version 3 image. Once the programming update is created, programming image server 232 sends the programming update to controller 230.

In one example, each image within the programming update is preceded by conditioning information that enables a lighting device to determine a corresponding image. For example, conditioning information may include a command to check lighting device version information. As discussed further below, upon receipt of the programming update, each lighting device may process the programming update and, based on conditioning information, select the corresponding image.

Controller 230 establishes an RF connection with each of light fixture 1, light fixture 2 and light fixture 3 and delivers the programming update to each via the established RF connection. Of note, each of these RF connections is a point-to-point connection between controller 230 and one of the lighting devices. In a Bluetooth example, the controller might pair with light 1 to send the update, then pair with light 2 to send the update, and then pair with light 3 to send the update. Upon receipt of the update, the receiving light fixture identifies the image(s) from the update corresponding to its version(s), extracts the corresponding image(s) and applies each extracted image. The receiving lighting device also delivers the update to neighboring lighting devices. For example, light 1 will deliver the update to light 4 and light 2 will deliver the update to light 5.

In one example, a lighting device determines neighbors based on a threshold, such as a minimum radio signal strength indicator (RSSI) value. Based on this RSSI value threshold, the updated lighting device only delivers the update to neighbors within the RSSI value threshold.

Figure 1B:
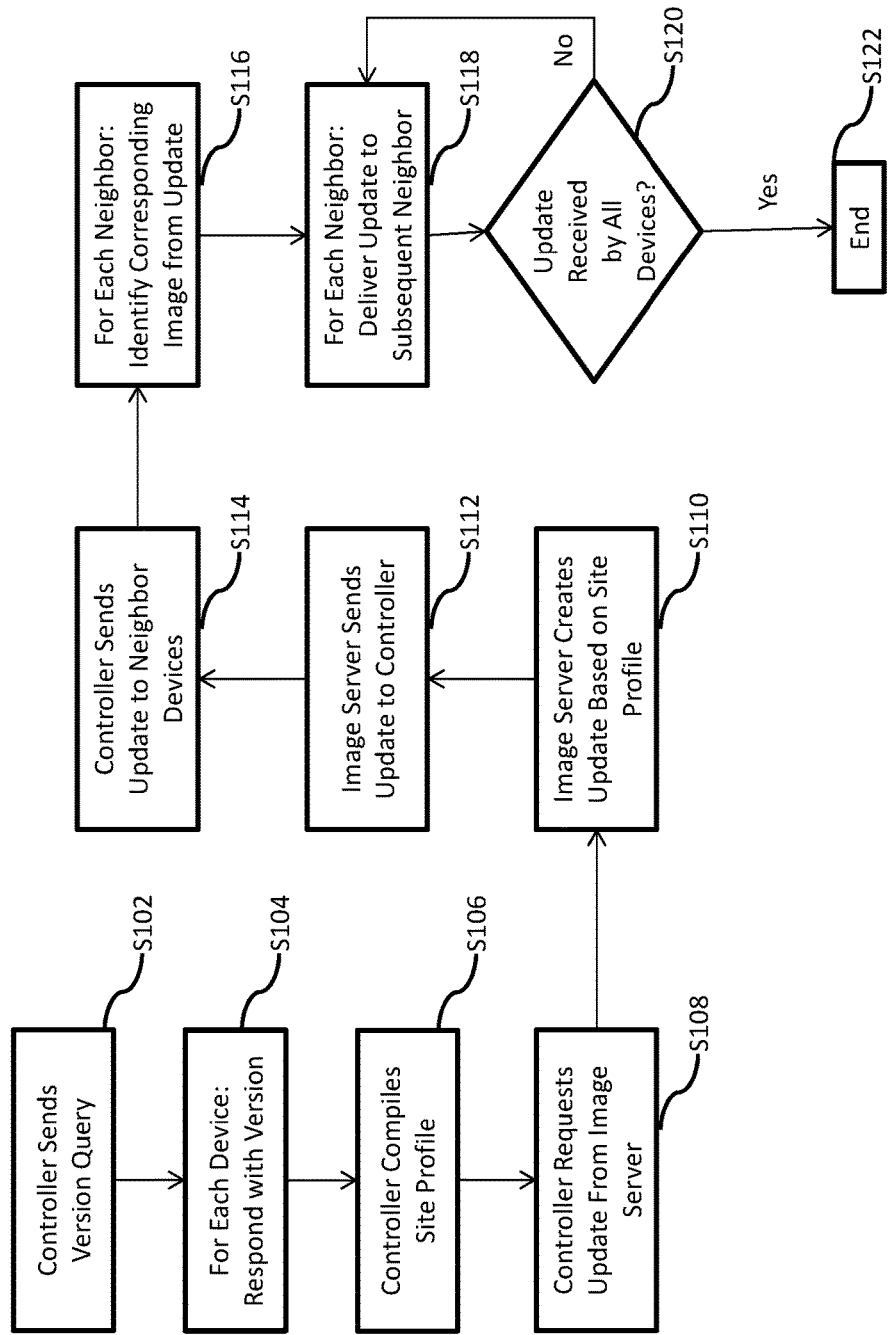
FIG. 1B is a high-level flow-chart of an example of a procedure utilized to identify lighting device versions within a lighting system and create a programming update including programming images corresponding to the identified lighting device versions.

FIG. 1B is a flow chart depicting an example of a procedure for utilizing a wireless mesh network to query lighting devices for lighting device version information, creating a site profile based on received lighting device version information, obtaining a programming update including only images corresponding to the received lighting device version information and delivering the programming update to the lighting devices. In step S102, a controller or update manager sends a query requesting lighting device version information from lighting devices installed within a site. In one example, the query is sent via wireless mesh networking between the lighting devices. In step S104, each lighting device responds to the query with lighting device version information, which is relayed back through the mesh to the controller. For example, as discussed above, each lighting device responds with an indication of one or more versions corresponding to the lighting device and/or components of the lighting device.

Controller, in step S106, receives the various responses through the mesh and compiles a site profile. In one example, the site profile includes an indication of each version of hardware and/or software existing within the lighting system at the site. Alternatively, or in addition, the site profile includes an indication of each lighting device or other element within an installation as well as corresponding hardware and/or software version information for each lighting device or other element. Then, in step S108, controller sends the site profile to the programming image server as part of a request for a programming update. In turn, programming image server, in step S110, creates the programming update based on the site profile and, in step S112, sends the programming update to the controller. As discussed above, the programming update includes only images corresponding to versions of lighting devices installed within the site, with each image preceded by conditioning information.

In step S114, controller sends the update to an initial number of lighting devices. For example, assuming the controller uses wireless itself to communicate, the controller identifies some number of lighting devices (e.g., with sufficient RSSI or other signal strength indicator) that are close enough to consider as neighbors to the controller itself. Alternatively, one or more lighting devices may be identified/designated as neighbors of the controller based on stored data. In any case, the controller updates its neighboring lighting devices. The controller updates neighboring lighting devices, for example, via point-to-point connections established with each neighboring lighting device via RF.

Upon receipt of the update, in step S116, each neighbor identifies a corresponding image(s) from the update, extracts the corresponding image(s) and applies the corresponding image(s) to operations of the neighboring lighting device. For example, the update may include conditioning information preceding each image. The conditioning information, in a further example, may be a command to check version information of the lighting device. Upon receipt, a lighting device may identify the corresponding image by evaluating the conditioning information. More specifically, given an update including a version 1 image, a version 2 image and a version 3 image, a version 1 lighting device would evaluate conditioning information preceding the version 1 image as a match while a version 2 lighting device would evaluate conditioning information preceding the version 2 image as a match.

In turn, each neighboring lighting device, in step S118, delivers the update to one or more subsequent neighboring devices. Such subsequent delivery is, for example, via a point-to-point connection established with the subsequent neighboring device via RF.

In step S120, a determination is made as to whether every lighting device within the site has received the programming update. If not, the process returns to step S118 where the programming update is delivered to additional neighboring devices. Otherwise, the process ends in step S122.

As outlined above, an approach like that of FIGS. 1A and 1B enables a site profile containing only lighting device version information for lighting devices installed within a site to be maintained and a consolidated programming update including only images corresponding to lighting device version information contained in the site profile to be created. Site profile maintenance is achieved via a wireless mesh query and delivery of the consolidated programming update is performed as an OTA update. Such efficient site-specific OTA updates reduce the need for manual intervention and improve the ability for timely delivery of updates.

Figure 2:
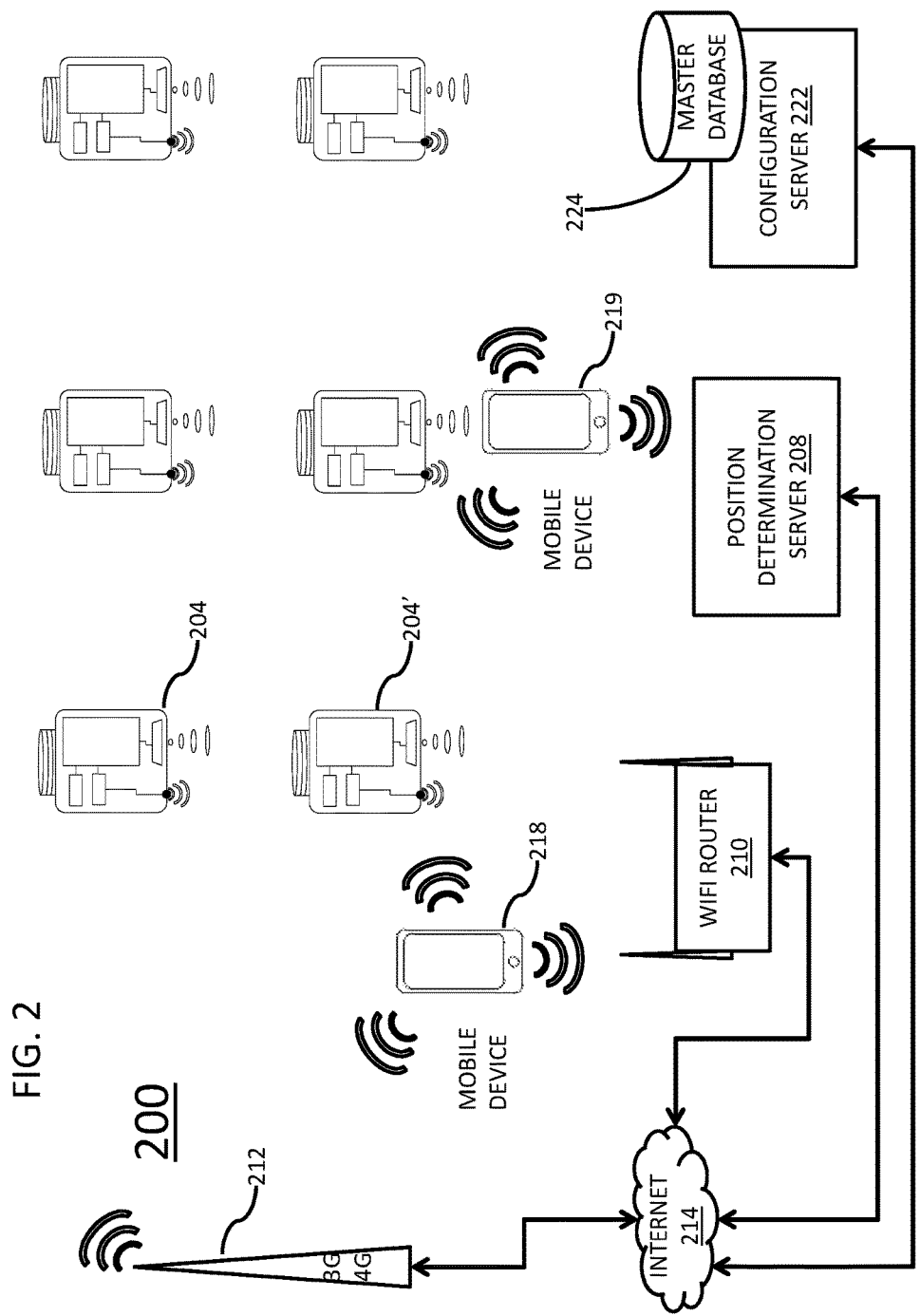
FIG. 2 depicts a system of lighting devices and network connected resources supporting a light-based positioning service for one or more mobile devices.
Figure 3:
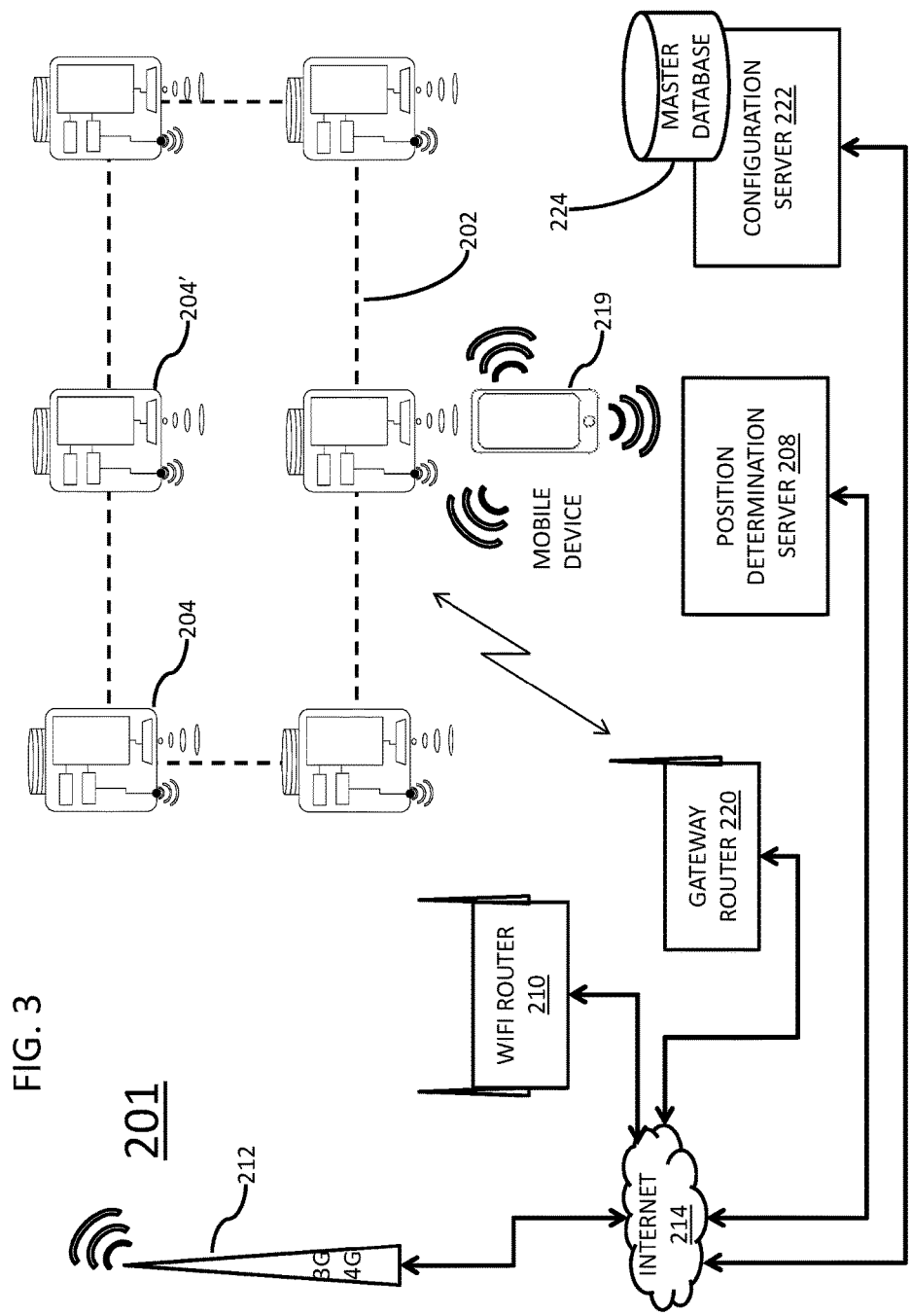
FIG. 3 depicts a system of lighting devices and network connected resources similar to that of FIG. 2, wherein the lighting devices also are arranged in an ad hoc wireless mesh-type network.

As noted, the OTA update procedure, such as a procedure as outlined above relative to FIGS. 1A and 1B, may be implemented in lighting devices having wireless communication capabilities. It may be helpful to consider examples of systems of such devices in more detail; and for that purpose, we will refer to examples that also support visible light communication, e.g. for positioning services or the like. FIGS. 2 and 3 therefore show somewhat different variations 200, 201 of a lighting and positioning system and components in communication with such a lighting and positioning system, wherein the lighting devices 204 have the capability to modulate output of the light sources thereof, e.g. for visual light communication (VLC) such as for position related operations. Firmware for the lighting devices of these examples may be updated over-the-air. The lighting and positioning system includes the actual lighting devices 204 and other resources such as servers 208 and 222 and master database 224 that interact with the lighting devices 204 for lighting or position-related functions. Other typical lighting system elements such as wall controllers and/or a centralized (e.g. building or campus wide) lighting controller are omitted for convenience.

The lighting devices 204 in our examples include wireless transceivers, such as radio-frequency transceivers, for various communication functions, although cable or optical fibers communication resources could be used. In the overall system 200 shown in FIG. 2, a mobile device 218 or the like communicates with one or more of the RF enabled lighting devices 204 over a short range RF wireless link, for example, to implement communication aspects of a process like that discussed above relative to FIGS. 1A and 1B. In the overall system 201 shown in FIG. 3, however, the RF enabled modulatable lighting devices 204 form an ad hoc mesh-type network 202 and optionally/temporarily communicate through the Internet 214, e.g. via a gateway router 220, to implement communication aspects of a process like that discussed above relative to FIGS. 1A and 1B.

A number of the elements shown in these two drawings are similar, indicated by the same reference numerals and will generally be described together with reference to both of FIGS. 2 and 3 below. The first of these drawings shows two mobile devices 218 and 219, whereas the second of these drawings shows only one of the mobile devices 219 discussed above relative to FIGS. 1A and 1B. The devices 218, 219 are similar in structure and functional capabilities, but the device 218 is used in this example for an additional or alternative purpose related to the OTA update techniques.

In these system examples (FIGS. 2 and 3), the mobile devices 219 or 218 have typical RF wireless communication transceivers, e.g. for communication via base station 212 of a public-carrier's mobile communication network and/or for wireless local area data network communication (e.g. WiFi) with a local router 210 in or near the premises served by the lighting devices 204. These communication capabilities support normal data communications applications for the mobile devices 218, 219. These communication capabilities, however, may also be used in some functions/services in relation to VLC based positioning. For example, the configuration server may communicate updates of entries in the master table database 224 to the mobile devices 219 and possibly the device 218. The mobile devices 219 (and possibly the device 218) include cameras and are programmed or otherwise configured to demodulate lighting device ID codes from images captured by the cameras for use in table lookups and related position determination and/or information retrieval functions based on the ID codes received from the lighting devices 204. The mobile devices may use their inherent RF wireless communication capabilities to also communicate through the Internet with other relevant resources represented by position determination server 208, e.g. for assistance in precise position determinations based on multiple ID codes alone or in combination with mobile device orientation data and/or to obtain other position or location related services such as routing instructions or product or service promotions.

In the systems 200, 201, the mobile devices 219 function essentially as user devices as described earlier. Positioning related communications of those devices 219 may use the cellular mobile network via a base station 212 or local wireless data network service like WiFi via router 210 provided at or near the relevant premises. As noted, the networked version of the system 201 shown in FIG. 3 implements a wireless (e.g. Bluetooth) ad hoc network 202 formed by the wireless-enabled lighting devices 204. Assuming that ad hoc network 204 has a link to a compatible wireless gateway router such as 220, then the ad hoc network 202 and the gateway router 220 may offer yet another data communication path for the mobile devices 219, including for data communications related to the positioning and location based services.

Turning now more specifically to OTA update functionalities, in FIG. 2, the mobile device 218 may communicate over a local data link, such as Bluetooth, with an individual one of the lighting devices 204' to which an OTA update is being communicated. An application or other program stored on and running in the mobile device 218 allows the device 218 to set up communications between the lighting device 204' and the configuration server 222 and perform OTA update operations like those discussed above. For example, during an OTA update procedure, such a link might be used to communicate a firmware revision or other update to the lighting device 204' as part of step S114 of the process of FIG. 1B. This operation to deliver the update to lighting device 204' may be in lieu of or in addition to the controller of FIG. 1A delivering the update. Alternatively, or in addition, mobile device 218 may fulfil the role of controller or otherwise be considered a controller, as related to FIGS. 1A and 1B.

FIG. 3 depicts a configuration of RF enabled modulatable lighting devices arranged in an ad hoc mesh-type network 202 and connected to Internet resources through a nearby gateway router 220. Although not shown, the ad hoc mesh-type network 202 may alternatively be temporarily connected to Internet resources through a nearby mobile device. Modulatable lighting devices 204 may be configured so that a modulated light signal provided from the light of each device 204 may be distinguished from modulated light signals produced by other nearby lighting devices 204 as well as from light outputs from other unmodulated sources or lighting devices (not shown). When such modulating lighting devices 204 are configured with RF capability and form a wireless network they may communicate configuration information from lighting device to lighting device.

A network capability as depicted in FIG. 2 may include access through a mobile device or other RF enabled device to external (non-mesh) networks. In an example where the mobile device temporarily serves as the gateway, software installed on a mobile device that is in contact with a non-mesh communications network (e.g., an app voluntarily installed on a smart phone that is connected to the Internet via WiFi and/or to a cell phone network) facilitates the mobile device to act as a network-to-network gateway. In the example, however, the system 201 includes another suitable network-network gateway 220 installed in the vicinity of one or more of the lighting devices 204 of the system. A network-network gateway 220 in close proximity to one of the networked lighting devices 204 may enable communication from at least one of the lighting devices and thus the network 202 through any suitable wireless networking link such as Ethernet, Zigbee, and the like.

In the example of FIG. 3, a mobile device that may have Bluetooth and WiFi and/or cellular communication capabilities may act as a gateway for communicating data to/from RF enabled modulatable lighting devices. If the lighting devices are configured into a network 202 with access via a gateway such as gateway router 200, it may be possible for an Internet resource, such as a position determination server 208, to communicate to a networked lighting devices 204 or 204' by passing data through the Internet 214. This may allow communication of information collected from mobile devices via the RF capability (e.g., identities of devices/users that pass through the area) by one of the lighting devices to a remote server, such as server 208. Of note for purposes of the OTA update processing, this communication capability also allows the configuration server to communicate with one or more of the lighting devices 204' to communicate a firmware revision or other update, such as in step S112 of the process of FIG. 1B.

Use of mobile devices as gateways between a VLC+RF system and another network (e.g., wireless mesh) may be opportunistic: e.g., mobile devices of customers who have installed an app related to the VLC+RF mesh may be opportunistically enlisted as gateways as the devices move in and out of the mesh's working space. Such a gateway function may be used, for example, to effectively increase the bandwidth of data reporting by mesh nodes to a server/controller, since under various conditions packets can be communicated more quickly through a gateway than through a series of mesh-node retransmissions. Gateway transmission may be used alternatively or additionally to transmission through a mesh controller node connected to a non-mesh network: e.g., upon failure of an external-connection node or device, a mesh may still be enabled to communicate with a server/controller device acting a gateway, carrying on its various functions while calling for diagnosis and repair of the failure.

In various examples, the position determination server 208 is a general-purpose mesh server and controller (back end) that performs functions other than or additional to position determination, issuing commands, such as an update command, to the RF and/or lighting capabilities of one or many network nodes, polling network nodes for information garnered from sensors, and so on. A general-purpose back end may be enabled to understand the locations, movements, and other aspects of mobile devices and other assets within the service area of the VLC+RF network mesh.

Illustrative capabilities include inventorying, assisted navigation and reality augmentation, RF asset tag location tracking, robot and drone tracking, time-of-day-based control, real-time user-tailored control of active assets (e.g., video displays), security management, routine customer assistance, emergency assistance, ambience adjustment (e.g., music, lighting, and other environmental adjustments in response to sensed user behaviors), and more. In another example, routine scan (advertising) packet broadcasts from Bluetooth-capable mobile devices are detected by the RF capability of nodes, enabling a mode of position estimation of the mobile device based on received signal strength indication (RSSI) and/or node detection pattern. Such estimates may be combined with estimates based on detection of VLC beacons by a light-sensing capability of the mobile device, e.g., after the device user is prompted to expose their device to light based on detection of their presence by the RF mode.

The configuration server 222 may be implemented as additional programming on the same general purpose computer implementing the position determination server 208. Alternatively, the configuration server 222 may be implemented on a separate network connected general purpose computer platform. Either one or both of the servers 208, 222 may be implemented in a distributed fashion on multiple network connected computers, e.g. to adequately serve a particular traffic load and/or to provide some level of redundant capacity for peak load or for use in the event of a failure of a primary server resource. The master database 224 may be implemented in a storage device of the general purpose computer(s) that implements the server 222 or the server 208, or the master database 224 may be implemented in a network connected storage device accessible to the appropriate general purpose server computer(s).

Figure 4:
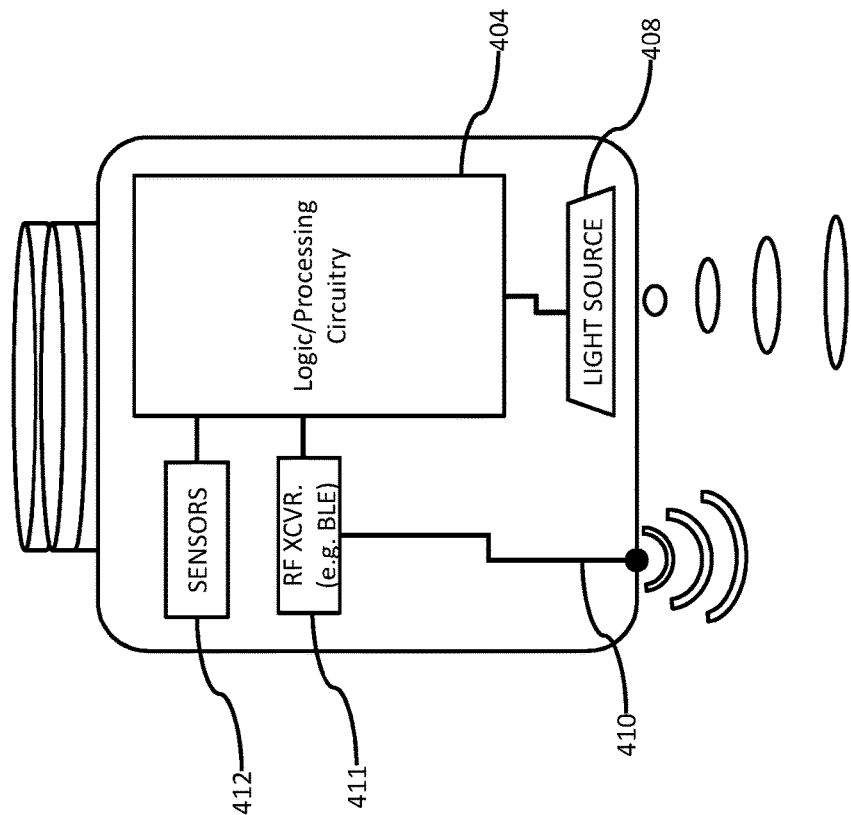
FIG. 4 is a simplified functional block diagram of an RF enabled modulatable lighting device that may be used in any of the examples of wireless networked lighting systems.
Figure 5:
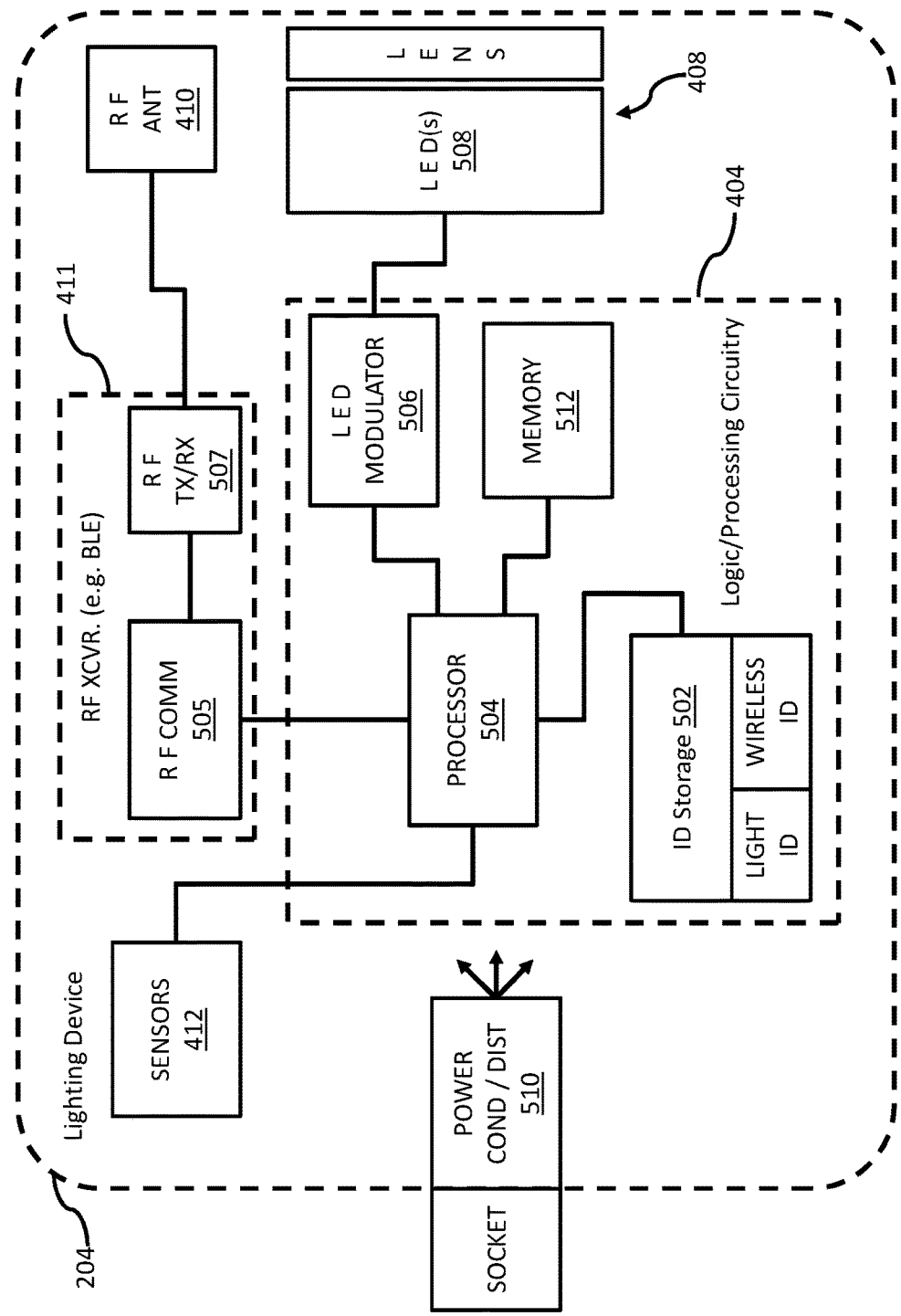
FIG. 5 is a somewhat more detailed functional block diagram of the example lighting device.

FIG. 4 is a somewhat schematic illustration and a somewhat block diagram type representation of one of the lighting devices 204; and FIG. 5 is a somewhat more detailed functional block diagram showing possible implementations of several elements of the example of the lighting device 204 of FIG. 4. Reference numbers used in common in both these drawings refer to the same items. For convenience, the description of these examples will refer to both drawings together, unless otherwise noted.

The example of a lighting device 204 in FIGS. 4 and 5 includes logic and/or processing circuitry 404 to drive and control operations of a light source 408 and control operations of other elements of the device 204. The light source 404 may be any suitable device capable of generating light in response to power that can be modulated. In the example of FIG. 5, one or more light emitting diodes (LEDs) 508 form the light source 408. The device 204 may include an optical processing element coupled to process the light output from the LEDs 508 that form the light source 408. Although other optical processing elements may be used, such as diffusers, reflectors and the like, the example of FIG. 5 shows a lens.

The logic and/or processing circuitry 404 may include elements such as a secure (possibly encrypted and/or key locked) ID storage 502, a processor 504, a modulator (LED modulator 506 in the example of FIG. 5) to supply and modulate power to the source 408, and a memory 512 as a storage device for programming and data. The secure ID storage 502 may be a separate physical storage device as shown or may be a secure section of the memory 512.

The secure ID storage 502 will store at least one lighting device ID code currently assigned to the particular lighting device 204, which the processor 504 uses to control the modulator 506 so that the lighting output from the LEDs 508 carries the assigned lighting device ID code. At least in some transitional operations, the secure ID storage 502 may store two lighting device IDs, e.g. a previously assigned lighting device ID code as well as a newly assigned shifter code stored before replacement/deletion of the previously assigned lighting device ID code. For RF operations, the lighting device 204 typically will also have one or more wireless ID codes, which may also be stored secure ID storage 502. Alternatively, a wireless device ID code may be burned into or otherwise relatively permanently stored in the applicable RF communication circuitry.

Although the light modulation could be optical and coupled to the output of the source 408 so as to vary a characteristic of light output before emission thereof to illuminate the premises; in the examples, the logic and/or processing circuitry 404 varies an aspect of power applied to the light source 408 to modulate the light generation by the source 408. In the LED example of the lighting device 204 shown in FIG. 5, the modulator 506 may be a controllable driver of a capacity appropriate for the number of and type of LEDs 508 that together form the light source 408, where the driver circuit forming the modulator 506 is sufficiently controllable to modulate the light output according to the modulation scheme used by the lighting devices 204 and detectable by the mobile devices 219.

Although purpose built logic circuitry could be used, the processor 504 typically is implemented by a programmable device such as a microprocessor or a microcontroller, configured to execute programs and process data that facilitate modulation of light from one or more LEDs lighting devices 508. The ID storage 502 and memory 512 may be implemented as separate circuit elements coupled to/accessible by the processor 504, e.g. if the processor is a microprocessor type device. A microcontroller typically is a 'system on a chip' that includes a central processing unit (CPU) and internal storage; therefore a microcontroller implementation might incorporate the processor 504, ID storage 502 and memory 512 within the microcontroller chip.

The processor 504 controls the LED modulator 506 to vary the power applied to drive the LEDs 508 to emit light. This control capability may allow control of intensity and/or color characteristics of illumination that the source 408 provides as output of the lighting device 204. Of note for purposes of discussion of position system operations, this control capability causes the modulator 506 to vary the power applied to drive the LEDs 508 to cause code modulation of light output of the light output of the source 408, including modulation to carry a currently assigned lighting device ID code from the secure storage 502. The processor and/or modulator may be configured to implement any of a variety of different light modulation techniques. A few examples of light modulation techniques that may be used include amplitude modulation, optical intensity modulation, amplitude-shift keying, frequency modulation, multi-tone modulation, frequency shift keying (FSK), ON-OFF keying (OOK), pulse width modulation (PWM), pulse position modulation (PPM), ternary manchester encoding (TME) modulation, and digital pulse recognition (DPR) modulation. Other modulation schemes may implement a combination of two or more modulation of these techniques.

As noted, the lighting devices 204 in our examples utilize wireless links to communicate, although other communication media and technologies may be adapted to carry communications discussed herein to and/or from the modulatable lighting devices 204. Hence, our wireless example of FIGS. 4 and 5 includes a radio frequency (RF) wireless transceiver (XCVR) 411 coupled to the logic and/or processing circuitry 404. The transceiver 411 in turn is coupled to an RF transmit/receive antenna 410 that may facilitate communication over wireless RF signals to and/or from other similarly equipped proximal devices, such as other lighting devices 204, mobile devices 218 or 219, wireless gateway router 220 or other wireless routers or relays, wireless enabled computing devices generally, RF equipped items such as appliances, tools, entertainment devices, RF tags, RF enabled network access points, multi-radio devices, and the like. The RF communication capability offered by transceiver 411 and the antenna 410 supports the various data communications of the lighting device 204 discussed herein, including those related to OTA firmware updates.

The RF transceiver 411 may conform to any appropriate RF wireless data communication standard such as wireless Ethernet (commonly referred to as WiFi) or Zigbee. In the example, however, the RF transceiver 411 is a Bluetooth wireless transceiver, more specifically conforming to the Bluetooth Low Energy (BLE) standard. At a still relatively high level, the BLE transceiver 411 may include RF communication circuitry 505 coupled to the processor 504 and RF transmit (TX) and receive (RX) physical layer circuitry 507 coupled to the RF transmit/receive antenna 410.

The lighting device 204 of FIGS. 4 and 5 may further include one or more sensors 412 for detecting aspects of the environment, including electromagnetic emissions from nearby computing devices or others of the lighting devices 204. As another class of examples, the sensors 412 may include one or more feedback sensors for detecting operational parameters of the device 204, such as the temperature and/or intensity or color characteristics of the light outputs of the LEDs 508. The sensors 412 may be connected to the processor 404 to facilitate collection, analysis, and communication of sensor data and/or data derived from the sensor data. Sensors may include ultrasonic sensors, video sensors, audio sensors, image sensors, optical sensors, temperature sensors, humidity sensors, air quality sensors, motion detection sensors, chemical sensors, radio frequency sensors, light intensity sensors, light color characteristic sensors, and the like. While the aforementioned sensor examples are contemplated, so are any other types of sensor that may detect an aspect of an environment into which the lighting device 204 may be deployed.

The lighting device 204 also includes power conditioning and distribution circuitry 510 coupled to receive power from the power mains provided to the lighting device 204, through a socket connection in the example of FIG. 5. The power conditioning and distribution circuitry 510 converts the power from the mains to one or more appropriate forms/levels required by the various electronic components of the lighting device 204 and distributes the converted power to those electronic components. Although deriving power from mains is shown and described for convenience, other power sources are contemplated, such as power over data networking, solar power, battery power, etc.

RF communication capabilities typically comply with some network-like standard, such as Bluetooth in our example. A Bluetooth network standard includes unique identifiers for each Bluetooth device that is connected to a wireless network. In a similar way, each RF enabled modulating light 204 may be configured with a unique RF wireless identifier. This RF wireless identifier may be used when determining a position of a properly equipped personal mobile device (e.g., a personal mobile device 219 with an RF capability, a camera capability, and a mobile device application for interacting with at least these two capabilities). While a capability to receive and process such an RF identifier may facilitate coarse device location, it is quite common for two or more RF wireless identifiers to be detectable in any of several positions due to the natural overlap of RF signals from nearby wireless devices. Therefore RF wireless identifiers alone may not be sufficient for fine position resolution. However, combining RF wireless identifier detection with modulated light detection techniques, may improve accuracy and performance.

One such way that improved performance may be achieved is through light namespace sharing. Because detection of a lighting device ID code from a modulated light output from a device 204 might require repeatedly receiving the modulated light to detect the specific device ID code, using an RF wireless identifier in combination with a modulated light type device ID may accelerate the determination of the lighting device ID code. This may be based on a known relationship between RF wireless identifiers and modulated lighting device ID codes, such as through a lookup function that accesses a dataset of identifiers/IDs that associates RF wireless identifiers with lighting device ID codes modulated on the light outputs of the devices 204. Even if two or more RF wireless identifiers are simultaneously detected due to RF signal overlap, determination of the corresponding modulated lighting device ID code for a device 204 may be much faster because the possible number of modulated light ID codes for devices 204 can be limited to those found in the lookup function for the simultaneously detected RF wireless identifiers.

The RF wireless identifiers modulated on the RF signals output by the transceivers 411 and antennas 410 of the lighting devices 204 may be inherent identifiers of the transceivers 411, e.g. wireless node IDs modulated on beacon or pilot channel signals broadcast by the transceivers 411 according to the BLE or other applicable wireless standard. Alternatively, the processors 504 may provide positioning/location system related node IDs to the transceivers 411 for inclusion in broadcast data messages.

To fully appreciate how one might implement a mesh OTA update, it may be helpful to some readers to consider a specific procedure example implementing mesh RF data communications in a system like those discussed above. FIGS. 6A-6D schematically depict the principles of packet communication between RF nodes of an illustrative VLC+RF mesh 2100 and the control of lights in the mesh by such communication according to various examples. The illustrative VLC+RF mesh depicted in FIGS. 6A-6D features six nodes. In this illustrative example, each node may resemble the radio frequency communication enabled light for transmitting modulated light 204 of FIG. 5; that is, each node comprises an RF transceiver capability, a light source, and a VLC modulation capability. In various examples, nodes may have capabilities other than or additional to those of light 204 in FIG. 5, and may vary in capability within the mesh (e.g., some nodes may possess only RF communications capabilities while some may have both RF and VLC capabilities).

Figure 6B:
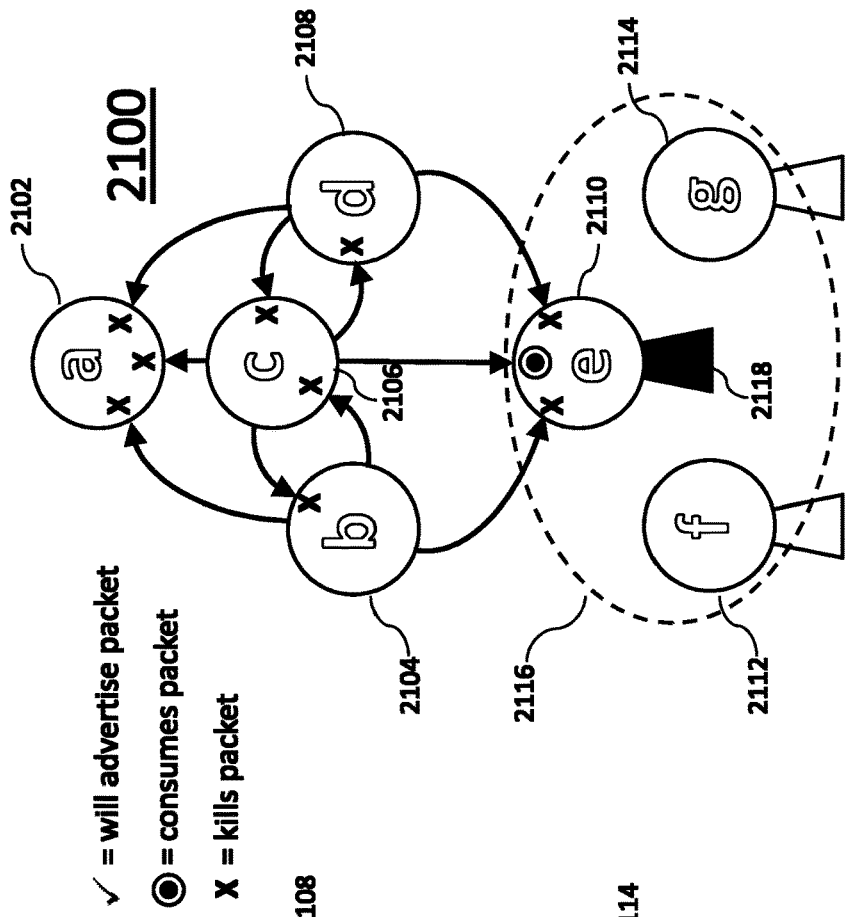
FIG. 6B schematically depicts an illustrative VLC+RF mesh, such as one of the systems of FIGS. 2 and 3, in a second state of packet transmission.

In the illustrative example, the RF transceiver capability of the nodes in FIGS. 6A-6D is of the digital packet type; that is, each RF transceiver broadcasts bits sequentially according to some physical modulation scheme, and the transmitted bits constitute groups or "packets" of fixed or, in some realizations, variable length. The bits of each packet, as shall be clarified for one illustrative example in FIG. 7, are divided schematically into a string of contiguous fields or sub-groups. The packet fields may include information identifying the packet itself, the transmitter of the packet (e.g., "Node a"), and the intended recipient of the packet (e.g., "all nodes," "Node c," "all nodes in Group Two"); commands (e.g., "turn off your light"); data collected by sensors (e.g., temperature); and other information. The broadcast of some packets may be required by an RF interoperability standard, such as the Bluetooth standard; other packets, while conforming to the standard, may be transmitted optionally, and may enwrap information in a manner that constitutes a communications channel. In broadcasting, required packets (e.g., Bluetooth advertisement packets) will preferably be given broadcast priority, and optional packets will be broadcast opportunistically.

The mesh 2100 of FIGS. 6A-6D operates in a waterfall or non-routed fashion: that is, each node transmits packets to all nodes within physical range and receives packets from all nodes within range, and rebroadcasts and/or acts upon each received packet, subject to certain rules, to all nodes within range. Some of the rules governing responses to received packets are as follows:

1) When not broadcasting a packet, listen for packets. This implies alternate broadcasting and listening. In various examples where the RF capability of a lighting device includes at least one each of an RF transmitter antenna and receiver antenna, broadcasting and listening may proceed simultaneously.

2) If a packet is detected, extract its identifier (a.k.a., packet ID or identifying information).

3) Store the packet ID in local memory, e.g., the RAM of lighting device 204 in FIG. 5. Also store the packet ID if originating the packet.

4) Compare received packet ID to packet IDs already in local memory, if any.

5) If the packet ID matches one found in memory, classify the received packet as "seen" and "kill" it: that is, do not act upon any command it contains and do not rebroadcast it.

6) If the packet ID does not match any in memory, examine the packet to see if it contains commands addressed to the receiving node, e.g., "turn on the light".

7) If the packet does not contain commands addressed to the receiving node, take no action beyond rebroadcasting the packet.

8) If the packet does contain a command addressed to the receiving node, then "consume" the packet: that is, (a) execute the command and (b) retransmit the packet if and only if the packet is also addressed to other nodes, e.g., if the packet is addressed to a group of nodes.

9) If the packet ID does not match any packet IDs found in local memory and is not consumable by the local node, place the packet in the broadcast queue and, for example, broadcast or "advertise" the packet at the earliest opportunity.

10) Retire each packet ID in local memory after it has been there a certain period of time, e.g., 2 seconds. This permits packet IDs to be re-used after, at minimum, the specified retirement age times the number of nodes in the mesh. Re-using of packet IDs is advantageous because (a) otherwise demand for RAM might become large and (b) packet IDs are specified by a fixed number of bits in a packet field and are therefore finite in number, so when unique packet IDs are exhausted one must either cease broadcasting or re-use IDs.

It will be clear to persons versed in the science of network communications that the above rules should be sufficient to assure that packets first broadcast by any node of the mesh will be communicated to every other node in the mesh and will cease to be rebroadcast by nodes in the mesh after a number of broadcast events not greater than the number of nodes in the mesh and potentially much smaller. It will also be clear that these rules are examples and that in various other examples, rule sets differing in various particulars from the example given, and likely more extensive, would also enable the practical operation of a packet-type, unrouted VLC+RF mesh (e.g., a BLE mesh). All such variations are contemplated and within the scope of the present discussion, as is the use of network topologies (e.g., bus, ring, star, tree) other than the illustrative mesh topology of FIGS. 6A-6D.

In the illustrative mesh 2100, each node's RF capability includes or consists essentially of a single antenna that may only transmit or receive at any given time: a node therefore listens for packets except when it is transmitting a packet. While transmitting, a mesh may miss (be deaf to) a packet broadcast by one or more other nodes. Although this potentially allows packets to disappear prematurely from the mesh, in various examples the VLC+RF mesh may incorporate at least two features that adequately mitigate the problem of packet-dropping: (1) for a given packet to be dropped by a mesh comprising asynchronous nodes, all nodes within receiving range of all other nodes broadcasting that packet must attempt transmission of that packet (or some other) simultaneously, and this is highly unlikely in an asynchronous mesh; and (2) as described further hereinbelow, a packet definition standard may permit the inclusion of a response command that requires a receiving node to transmit a confirmation packet back through the mesh. Failure by a mesh controller node to receive a response packet may trigger presumption of a packet drop—loss either of the original packet or of the confirmation packet—and thus rebroadcast of the original packet. This process may be repeated until a timeout is reached and a network failure flag is raised or until packet receipt is confirmed.

In FIGS. 6A-6D, the progress of a single packet through an illustrative VLC+RF mesh 2100 is schematically illustrated. The packet (not shown) is either delivered to Node a 2102 from a device or network outside the mesh or is constructed within Node a 2102 by appropriate devices comprised by the node; or, a packet may originate within any other node in the mesh 2100. In the case illustrated, Node a 2102 broadcasts (advertises) the packet. In FIGS. 6A-6D, receipt of a packet broadcast by a node is indicated by an arrow drawn between the broadcasting node and the receiving node; e.g., in FIG. 6A, the broadcast from Node a 2102 is received by Node b 2104, Node c 2106, and Node d 2108. No other nodes in the mesh 2100 are within physical receiving range of Node a 2102. At the head of each arrow denoting successful transmission, a mark within the receiving node denotes the fate of packet: (1) A check-mark indicates that the node simply re-broadcasts the packet, (2) a bull's-eye indicates that the node consumes the packet (which may or may not entail rebroadcasting), and (c) an "X" indicates that the node kills the packet.

Figure 6A:
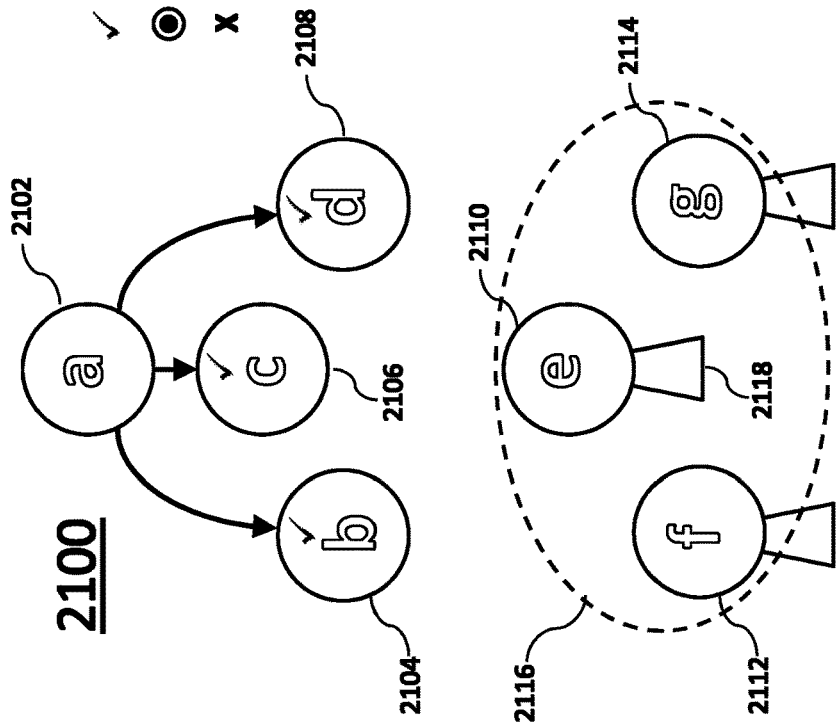
FIG. 6A schematically depicts an illustrative VLC+RF mesh, such as one of the systems of FIGS. 2 and 3, in a first state of packet transmission.
Figure 7:
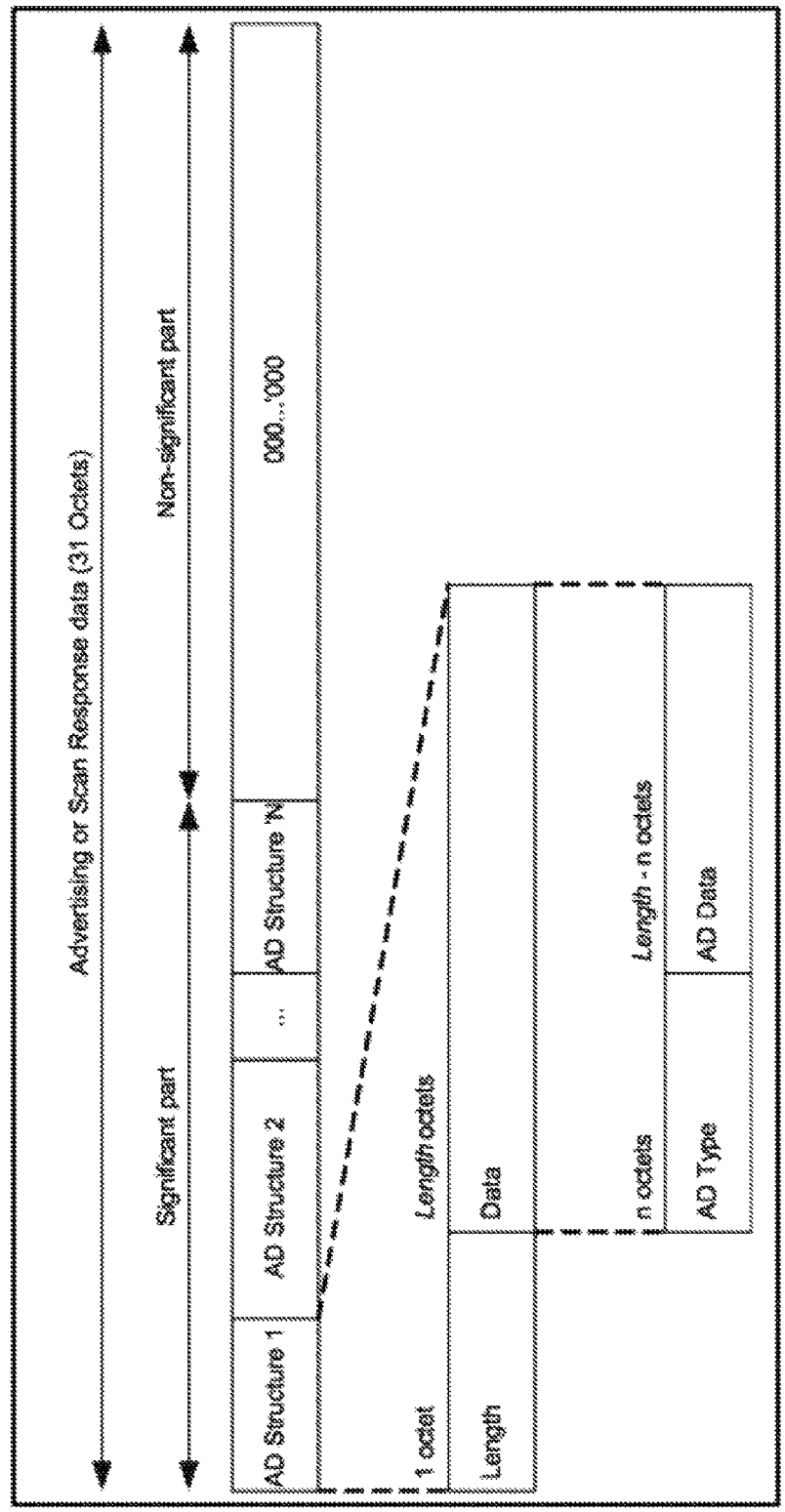
FIG. 7 depicts the structure of an illustrative digital RF packet utilized in one of the lighting systems wireless communication capabilities.

In FIG. 6A, Node e 2110, Node f 2112, and Node g 2114 constitute a group, Group One 2116, within the mesh 2100 (e.g., lighting devices in a particular section of a retail space). The packet protocol of mesh 2100 enables commands be broadcast through the mesh 2100 that are executed by all nodes in Group One 2116 and by no others; nodes in a Group may also be individually addressed and controlled. In the state of mesh operation depicted in FIG. 6A, the light capability of Node e 2110, Node f 2112, and Node g 2114 is On, as indicated by open cones attached to the nodes of Group One 2114 (e.g., cone 2118). The illustrative packet transmitted by Node a 2102 is addressed to the nodes of Group One 2116 and contains a command to turn off the lights.

In FIG. 6A, the broadcast from Node a 2102 has been received by Node b 2104, Node c 2106, and Node d 2108. None of these nodes find the packet ID in memory, nor find that they are addressed by the packet. They therefore rebroadcast the packet, as indicated by the checkmarks in the node symbols.

FIG. 6B depicts the results of rebroadcast of the packet by Node b 2104, Node c 2106, and Node d 2108. In this illustrative mesh, the nodes are presumed to be operating in a non-synchronous manner so that packet collision (simultaneous broadcast of a packet by more than one node) is rare enough to be neglected. Node a 2102 receives the broadcasts of Node b 2104, Node c 2106, and Node d 2108; Node b 2104 receives the broadcast of Node c 2106; Node b 2104 and Node d 2108 are too far apart to receive each other's broadcasts; Node c 2106 receives the broadcasts of Node b 2104 and Node d 2108; and Node d 2108 receives the broadcast of Node c 2106. All packets received by these four nodes are killed, because all nodes find the ID of this packet in their "seen" list. Node e 2110 is the only node in Group One 2116 within receiving range of any of the first four nodes in the mesh (a-d) and receives transmissions from Node b 2104, Node c 2106, and Node d 2108. In this illustrative case it is posited that Node c 2106 is the first of these three nodes to rebroadcast the packet; therefore, Node e 2110 first sees the packet as broadcast by Node c 2106, places the packet ID in memory, and kills the packets redundantly received from Node b 2104 and Node d 2108.

Since Node e 2110 is in Group One 2116, to which the packet is addressed, upon examining the packet Node e finds a command addressed to itself and its fellow group members. Node e 2110 therefore consumes the packet, i.e., turns off its light and puts the packet on its broadcast queue. In FIG. 6B, the turning off of the light capability of Node e 2110 is represented by blackening in of the cone 2118.

FIG. 6C depicts a subsequent state of operation of the mesh 2100 in which Node e 2110 has rebroadcast the packet. This broadcast is received by all nodes in the mesh 2100 except Node a, which is too distant to receive it. The packet is killed by Node b 2104, Node c 2106, and Node d 2108, as these have already seen the packet, but it is consumed by Node f 2112 and Node g 2114, which turn off their lights (as indicated by blackening in of the cones 2120).

FIG. 6D depicts the final stage in the history of the packet, which is rebroadcast by Node f 2112 and Node g 2114. All nodes in Group One 2116 receive this broadcast packet but all identify it as "seen" and kill it. Thereafter, the packet is no longer broadcast by any node in the network; also, its intended function (control of the lighting devices in Group One 2116) has been accomplished. Similar propagation of various packet types containing data, commands, and the like, whether in this illustrative network or in more extensive networks, may be readily envisaged.

Typically, one node in the mesh 2100 is denoted a "mesh controller," which has unique authority (within a given mesh) to issue commands, receive data, and communicate with a device, mesh, or network outside the mesh. The mesh controller node may be a VLC+RF node or another Bluetooth-capable device (e.g., gateway, phone, laptop, server, joint Bluetooth+WiFi device). In various examples, as is clarified further hereinbelow with reference to FIG. 7, a packet may contain a "command response" field that, set to an active state, instructs addressee nodes to transmit packets acknowledging receipt and execution of the command packet or returning data to the mesh controller. For example, if Node a 2102 of FIGS. 6A-6D were designated a mesh controller, and the packet transmitted in the illustrative packet history included an active command response flag, the state of operation of FIG. 6D would be followed by transmission of response packets by the three nodes of Group One 2116, which response packets would contain information confirming the dousing of the Group's lights and which would cease to propagate through the mesh 2100 only after having been consumed by Node a 2102. In general, a mesh controller may poll other nodes in a mesh 2100 for a range of information, including the operational state of its various capabilities, sensor data, ID data, LED operational history (e.g., current, voltage), ambient temperature, and the like. Also, a mesh controller may issue commands triggering propagation of updates, such as described above in relation to FIGS. 1A and 1B, and other operational parameters of nodes or changing the operational states of lights and RF transceivers, and may demand confirmation of the receipt and execution of such commands, and may communicate with devices, meshes, servers, networks, and the like outside the mesh.

Commands propagated throughout the mesh from a mesh controller may enable a number of functions. Without limitation, these include (a) light brightness control (on, off, dimming, flashing, VLC message programming, etc.), (b) directional control of lights equipped with mechanical activators, (c) lighting device version querying, (d) retrieval of data from sensors, and (e) retrieval of data collected by the RF capability of the mesh from mobile devices, tags, other nodes, and the like.

In various examples, provision is made for automatic specification of a mesh controller node, either upon system startup or in the event of failure of the designated mesh controller node; alternatively or additionally, the mesh may be configured to operate autonomously in one or more pre-determined default modes in the event that a mesh controller ceases to operate. For example, in the absence of commands from a mesh controller, the mesh nodes may be programmed to broadcast VLC beacon ID information and keep the lights on until further notice, and record sensor data in RAM in a wraparound fashion that records a moving window of most-recent readings.

In the example, the mesh command and several other types of mesh communications use the Bluetooth advertising packet. FIG. 7 depicts an illustrative advertising packet structure 2200 for the RF wireless mesh of a lighting system, according to various examples that employ some forms of the Bluetooth standard for the RF communication. Typically, a Bluetooth device is required to transmit packets containing constrained, self-identifying content on a regular basis. Other packets may be transmitted optionally by the device. In various examples, the optional packets, herein termed VLC+RF packets, may be structured to perform the functions of mesh control, illumination control, VLC control, tag sensing, sensor reporting, mobile device detection, and other as described elsewhere herein. The following paragraphs describe the structure of VLC+RF packets (using the Bluetooth advertising packet format) employed by the RF aspect of a VLC+RF mesh.

Each VLC+RF packet may be 31 bytes long, where a byte is defined as 8 bits (an octet). Each packet may be an Advertising packet (i.e., a packet containing identification or command information) or a Scan Response packet (i.e., a packet containing data solicited by a controller, including information about receipt of Advertising packets, execution of commands therein, etc.); Advertising and Scan/Command Response packets differ in function and content, but not in format. Each packet comprises a Significant Part and a Nonsignificant Part; the Significant Part may occupy the whole of the packet. Within the Significant Part, a packet payload may be broken down into a collection of Advertisement Data (AD) Structures, each, as indicated in FIG. 7, composed of a single byte specifying the length of the AD Structure, a single byte specifying the AD Structure type, and some number of bytes of AD Data. Type identifiers for AD Structures are typically assigned numbers by the Bluetooth Special Interest Group.

In an example, the VLC+RF packet contains a single AD Structure that may occupy up to the whole 31 bytes of the packet; this maximizes the non-overhead payload content of the packet. Thus, of the 31 packet bytes, 1 is occupied by the AD Length specification byte, 1 is occupied by the AD Type specification byte, and up to 29 bytes are occupied by a Mesh Message or Scan Response Message. The AD Type specification byte is set to 0xFF, the Bluetooth code for "Manufacturer Specific Data", or 0x16, the Bluetooth code for "Service Data." To distinguish a Mesh packet from other Manufacturer Specific Advertising Data packets that may be sent (e.g., to mobile devices in the working space of the VLC+RF system), each Mesh Message will begin with a fixed Mesh-Specific Sequence (MSS) of 2 bytes, fixed at some arbitrary value (e.g., 0xB1BC). Similarly, to distinguish a Scan Response Message packet from other Service Data packets that may be sent, each Scan Response Message will begin with a fixed Service UUID of 2 bytes, fixed at some arbitrary value (e.g., 0xB1BB).

The remainder of the Mesh Message or Scan Response Message (up to 27 bytes) consists of encrypted packet contents. Encryption prevents unauthorized users from taking control of the VLC+RF mesh and its functions (e.g., turning lights on and off) or harvesting information from the mesh. Nodes will decrypt a packet if they determine that it is not on their seen list, and examine its contents to see if they are an addressee of the packet. Encryption may be by a variety of cryptographic techniques: in one example, a reversible cryptographic hash is employed. A portion of the encrypted packet contents (e.g., 2 bytes), possibly up to and including the entire encrypted packet contents is employed as a quasi-unique packet identifier ("quasi"-unique because although the number of possible M-bit strings is large for nontrivial M, it cannot be infinite—hence the need for ID re-use as discussed hereinabove with reference to FIGS. 6A-6D). This packet identifier may be the string employed by nodes for identifying packets as seen or not-seen, as discussed hereinabove with reference to the illustrative mesh of FIGS. 6A-6D.

The pre-encrypted or decrypted portion of the packet payload for a Mesh Message consists of (a) an octet of 8 1-bit flags, (b) the 3-byte ID code of the VLC+RF node originating the packet, (c) the 3-byte ID code of the addressee, which may be either a single node or a group of nodes, and (d) a Mesh Payload of up to 18 bytes length containing Commands and Parameters.

The AD structure of the VLC+RF packet for a Mesh Message is as follows, where N≤31 is the number of bytes in the AD Structure:

AD Structure Map

| Length Specifier value = N | AD Type Specifier 0xFF | Message-Specific Sequence 0xB1BC | Flags Byte flags | Source Address Node ID | Destination Address Node or Group ID | Mesh Payload Command + Parameters |
|---|---|---|---|---|---|---|
| 1 byte | 1 byte | 2 bytes | 1 byte | 3 bytes | 3 bytes | ≤20 bytes |

The functions of the Flags Byte bits are defined as follows:

Flags Byte Map

| Group | Response | Reserved | Reserved | Reserved | Channel ID | Channel ID | Channel ID |
|---|---|---|---|---|---|---|---|
| bit 7 | bit 6 | bit 5 | bit 4 | bit 3 | bit 2 | bit 1 | bit 0 |

The functions of the Flags Byte bits are further explained as follows: (1Bit 7, the Group bit is 0 if the destination address field is an individual node address, or 1 if the destination addressee field denotes a group number (where Group Address 0 denotes indiscriminate broadcast). (2) Bit 6, the Response bit, is 0 if the receiving node should not generate a response packet, and 1 if the receiving node should generate a response packet. (3) Bits 0-2, the three-bit Channel ID field, enable the specification of 8 ($=2^3$) channels. Each "channel" may be reserved for the use of a particular mesh. Thus, if the physical broadcast and reception spaces of nearby meshes (e.g., on adjacent floors of a building) overlap, traffic may still be segregated between the meshes by use of the Channel ID field. Each node in each mesh is programmed during system commissioning with its own Channel ID, and if a received packet contains another Channel ID, the node kills the packet.

The Command field and Parameters within the Mesh Payload field may be designated as follows: (1) A single byte may be devoted to specifying a Command; this allows the definition of 256 ($=2^8$) distinct Commands, which is ample for the operation of a VLC+RF mesh in various examples. Examples of Command field values include Set Mesh Controller Node ID, Response Packet (signifying that this packet is a response packet), Set Light Brightness Level, Blink Light, Set VLC Beacon ID, Device Data Channel (signifying that the packet payload consists of data being transmitted on a virtual channel above the packet layer), Update, Query, and others. (2) Parameters may contain data of any kind, including RF node IDs, VLC node IDs, light brightness level specifiers, portions of multi-packet commands, data for transmission to mobile devices in the service space, a target version for performing OTA updates, and a variety of other control, commissioning, and communications data. The Parameters field enables the VLC+RF packet protocol to act (as is common for packet protocols) as the basis for a structure of one or more virtual data channels that convey messages broken into fragments for transmission in packets. The bit rate of such virtual channels must always be less than the physical bit rate of the packet layer, but there are few constraints on the informational character of such virtual channels, which may include field definitions, error correction, encryption, packet structure, and any other features capable of example in a digital data stream.

In relation to the OTA update procedure discussed above relative to FIGS. 1A-1B, the Mesh Payload in the advertising packet may carry an update command and/or an identify command. In the situation of an update command, the structure of the Parameters portion of the Mesh Payload is as follows:

Update Command

| Firmware Type | Target Firmware Major | Target Firmware Minor | RSSI Minimum |
|---|---|---|---|
| value = 0-4 | value = 0-255 | value = 0-255 | value = minimum RSSI in dBm |
| 1 byte | 1 byte | 1 bytes | 1 byte |

The firmware type field indicates the type of programming to be updated within a lighting device. A lighting device, for example, has 3 different types of programming: (a) a bootloader; (b) softdevice; and (c) application. The bootloader is responsible for managing the device when power is applied to the device and primarily controls launching the softdevice. The softdevice, for example, represents the firmware or other programming that implements an operating system or environment within the lighting device. An application is a set of programming that implements specific instructions (e.g., VLC functionality) within the lighting device. In one example, the firmware type has a value of 1 when the softdevice is to be updated, a value of 2 when the bootloader is to be updated, a value of 3 when both the softdevice and the bootloader are to be updated and a value of 4 when the application is to be updated.

The target firmware major and target firmware minor together define the updated version of firmware or other programming to be delivered to neighboring lighting devices. For example, if the updated version is 2.3, then the target firmware major field would have a value of 2 and the target firmware minor filed would have a value of 3. The RSSI minimum field represents a threshold by which a lighting device can determine neighbors. In one example, the RSSI minimum field contains a value between −50 dBm and −75 dBm as a recommended threshold value.

Of note, the firmware type field defines "what" is to be updated and the target firmware major and target firmware minor fields together define "who" is to deliver the update as well as "to whom" the update is to be delivered. For a lighting device receiving an update command within a Mesh Message, the lighting device can easily determine a current version of any one of the softdevice, the bootloader, or an application which the lighting device is currently executing. However, for the receiving device to determine whether to deliver updated firmware or programming to a neighbor, the receiving device needs to also know a current version being executed by the neighbor. Although other techniques may be used to determine neighbors' firmware versions, in a Bluetooth network, such information is provided via a Scan Response Message. The structure of the Scan Response Message is as follows:

Scan Response Message

| Length Specifier | AD Type Specifier | Service UUID | Service Data |
|---|---|---|---|
| value = N 1 byte | 0 × 16 1 byte | 0 × B1BB 2 bytes | Device Identifying Information ≤27 bytes |

Of note, the Scan Response Message follows the same AD structure of the Mesh Message, however the AD Type is different and the payload portion contains fewer fields. More specifically, the Scan Response Message does not include address fields. But, as with the Mesh Payload field of the Mesh Message, the Service Data field of the Scan Response Message contains various sub-fields. The structure of the Service Data field is as follows:

Service Data Field

| UUID and Other IDs | Softdevice Version | Reserved | Firmware Major | Firmware Minor | Bootloader Version |
|---|---|---|---|---|---|
| 19 bytes | 2 bytes | 1 bytes | 1 byte | 1 byte | 1 byte |

As can be seen, the Service Data Field of the Scan Response Message includes information regarding the current versions that the neighbor is executing. In one example, the receiving lighting device will store the relevant information each time a Scan Response Message is received from a neighbor. Alternatively, given the frequency with which Scan Response Messages are sent, a lighting device that has received an update command via mesh networking may simply wait until another Scan Response Message is received from a neighbor in order to determine whether the neighbor needs to receive the update.

In contrast to the mesh update command that includes a Parameters portion as described above, a mesh query command may not include a Parameters portion. Instead, the Mesh Payload may only include the mesh query within the Command byte. Furthermore, a Scan Response Message generated in response to the query command will contain a Service Data Field with different sub-fields. For example, the Service Data Field generated as a result of a mesh query command may have the following structure:

Service Data Field

| OEM ID | Product ID | Form Factor | Hardware Revision | Bundle Version | Bundle Subversion |
|---|---|---|---|---|---|
| 1 byte | 1 byte | 1 byte | 1 byte | 1 byte | 1 byte |

As can be seen, the Service Data Field of the Scan Response Message, in response to a query command, includes information about specific hardware and software versions of a lighting device. For example, the OEM ID identifies a manufacturer of a lighting device and the Product ID identifies a particular product type. In this example, the Form Factor indicates a hardware version and the Hardware Revision indicates an iteration of the hardware type. In addition, the Bundle Version, in this example, indicates a firmware version and the Bundle Subversion indicates a firmware subversion.

Packet life cycle has already been partly described with reference to FIGS. 6A-6D. In various examples, two numerical parameters are defined for the whole RF capability of the mesh (e.g., programmed into the nonvolatile memory of all RF nodes) during commissioning of the mesh, namely (1) ADV_PER_PKT and (2) ADV_SEEN_TIME_LIMIT. ADV_PER_PKT is the number of times a mesh packet will be advertised by each mesh node (e.g., once), if the packet is to be advertised. ADV_SEEN_TIME_LIMIT is the number of seconds after receipt (e.g., two) that a packet ID expires (i.e., is deleted from the packet ID stack in node memory). ADV_PER_PKT constrains the amount of traffic across the mesh that will be entailed by the transmission of each packet; ADV_SEEN_TIME_LIMIT tends to constrain the lifetime of a packet in the mesh (although transmission through node rings and other cases, for sufficiently large meshes, could enable packets to ring through the mesh even after ADV_SEEN_TIME_LIMIT has expired). Decreasing either or both parameters tends to decrease the probability that a packet will be dropped; increasing either or both parameters tends to increase the lifetime of each packet in the mesh and so limit the effective bandwidth of the mesh as a whole.

It will be clear to a person familiar with the science of network communications that the foregoing packet and mesh specifications may in various examples be varied in many particulars without substantively altering the capabilities and applications of distribution of a programming update as described herein.

As shown by the above discussion, functions relating to an OTA update procedure in a lighting system implementing such OTA updates may be implemented on computers connected for data communication via the components of a packet data network, operating as a server computer, user terminal and/or as mobile device e.g. to function as the programming image server or in some cases to function as the controller and/or to run the update manager. Although special purpose devices may be used, such devices also may be implemented using one or more hardware platforms intended to represent a general class of data processing device commonly used to run "server" programming, for example, to perform functions attributed to the configuration server discussed above, albeit with an appropriate network connection for data communication.

As known in the data processing and communications arts, a general-purpose computer typically includes a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. firmware revisions. The software code is executable by the general-purpose computer that functions as the configuration server and/or that functions as a mobile terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology to provide relevant aspects of the OTA updates to any of the lighting devices of a lighting positioning system, in essentially the manner performed in the implementations discussed and illustrated herein.

FIGS. 8 and 9 provide functional block diagram illustrations of general purpose computer hardware platforms. FIG. 8 illustrates a network or host computer platform, as may typically be used to implement a server. FIG. 9 depicts a computer with user interface elements, as may be used to implement a personal computer or other type of work station or terminal device, although the computer of FIG. 9 may also act as a server if appropriately programmed. It is believed that those skilled in the art are familiar with the structure, programming and general operation of such computer equipment and as a result the drawings should be self-explanatory.

Hardware of a server computer, for example (FIG. 8), includes a data communication interface for packet data communication. The server computer also includes a central processing unit (CPU), in the form of circuitry forming one or more processors, for executing program instructions. The server platform hardware typically includes an internal communication bus, program and/or data storage for various programs and data files to be processed and/or communicated by the server computer, although the server computer often receives programming and data via network communications. The hardware elements, operating systems and programming languages of such server computers are conventional in nature, and it is presumed that those skilled in the art are adequately familiar therewith. Of course, the server functions may be implemented in a distributed fashion on a number of similar hardware platforms, to distribute the processing load.

Hardware of a computer type user terminal device, such as a PC or tablet computer, similarly includes a data communication interface, CPU, main memory and one or more mass storage devices for storing user data and the various executable programs (see FIG. 9). A mobile device (FIG. 10) type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphone type mobile devices include similar but smaller input and output elements. Tablets and other types of smartphone type mobile devices utilize touch sensitive display screens, instead of separate keyboard and cursor control elements. In the example (FIG. 10), the mobile device also includes one or more rolling shutter type cameras, although other types of cameras, image sensors or optical detectors may be used. The hardware elements, operating systems and programming languages of such user terminal devices also are conventional in nature, and it is presumed that those skilled in the art are adequately familiar therewith.

Hence, aspects of the methods of providing OTA updates to lighting devices of a lighting system outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming and/or the relevant data. All or portions of the software and/or the relevant data may at times be communicated through the Internet or various other telecommunication networks. Such communications, for example, may enable loading of the programming and the database from one computer or processor into another, for example, from a management server or host computer of the positioning service provider into the computer platform of the configuration that is active and on-line to perform the relevant server functions in an actual working environment. Thus, another type of media that may bear the software elements and data includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that includes the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system, comprising:
   lighting devices, each lighting device comprising:
      a light source;
      a memory;
      a wireless communication transceiver; and
      logic/processing circuitry coupled to control the light source and coupled to communicate via the transceiver;

a programming image server comprising:
  a processor;
  a network communication interface coupled to the processor; and
  a memory coupled to the processor and storing a plurality of lighting device programming images, each lighting device programming image corresponding to a different lighting device version; and
an update manager configured to:
  send, via a wireless flooding network formed by the wireless communication transceivers, a query intended for all of the lighting devices, the query requesting lighting device version information;
  for each respective lighting device:
    receive, via the wireless flooding network, a query response from the respective lighting device, the query response indicating a respective lighting device version of the respective lighting device;
    determine whether a site profile includes an indication of the respective lighting device version; and
    upon a determination that the site profile does not include the indication of the respective lighting device version, add the indication of the respective lighting device version to the site profile so as to compile the site profile for all of the lighting devices at a site based upon receipt of the query response from each of the lighting devices such that the compiled site profile includes indications of versions only for different lighting device versions among the lighting devices at the site;
  upon compilation of the site profile send, to the programming image server, a request for an update of lighting device programming, the request including the compiled site profile indicating the different lighting device versions among the lighting devices at the site;
  receive, from the programming image server, the requested update of lighting device programming;
  determine one or more of the lighting devices located proximate the update manager; and
  deliver the update of lighting device programming to one or more of the determined lighting devices located proximate the update manager;
wherein:
the programming image server is configured to:
  receive the request for the update of lighting device programming;
  create the update of lighting device programming to include a number of the plurality of lighting device programming images corresponding to the versions of lighting devices indicated in the site profile; and
  send the update of lighting device programming including the number of plurality of lighting device programming images corresponding to the versions of the lighting devices to the update manager; and
the logic/processing circuitry of each respective one of the determined lighting devices configures the respective determined lighting device to:
  upon receipt of the update of lighting device programming, identify a lighting device programming image included among the plurality of lighting device programming images corresponding to the version of the respective determined lighting device;
  extract the identified lighting device programming image corresponding to the version of the respective determined lighting device from the update of lighting device programming;
  apply only the extracted lighting device programming image corresponding to the version of the respective lighting device to operations of the respective determined lighting device;
  identify a number of lighting devices, located proximate the respective lighting device as having not received the update of lighting device programming; and
  for each respective one of the identified number of proximate lighting devices:
    (a) establish a communications connection of the respective lighting device with the respective identified lighting device; and
    (b) deliver, via the established connection, the update of lighting device programming including the number of plurality of lighting device programming images corresponding to the versions of the lighting devices to the respective identified lighting device.

2. The system of claim 1, wherein the logic/processing circuitry of each of the lighting devices configures the respective lighting device to:
  determine whether the respective lighting device had previously received the query; and
  upon determination that the respective lighting device had not previously received the query, rebroadcast the query via the wireless flooding network.

3. The system of claim 1, wherein the logic/processing circuitry of each of the lighting devices configures the respective lighting device to:
  determine whether the respective lighting device had previously received the query; and
  upon determination that the respective lighting device had previously received the query, do not rebroadcast the update command via the wireless flooding network.

4. The system of claim 1, wherein the logic/processing circuitry of each of the lighting devices configures the respective lighting device to identify the proximate lighting devices based on respective received signal strength indicator (RSSI) values such that the identified number of lighting devices includes only one or more lighting devices each having a corresponding RSSI value exceeding a predetermined threshold.

5. The system of claim 1, wherein the logic/processing circuitry of each of the lighting devices configures the respective lighting device to:
  upon receipt of the query, identify the respective lighting device version of the respective lighting device;
  create the query response to include the indication of the respective lighting device version; and
  send the query response to the update manager.

6. The system of claim 1, wherein the programming image server is further configured to:
  upon receipt of the request for the update of lighting device programming, identify each lighting device version indicated in the site profile; and
  for each identified lighting device version, include, from the plurality of lighting device programming images, the corresponding lighting device programming image in the update of lighting device programming.

7. A method, comprising:
  sending, from a computing device, to each of a plurality of lighting devices and via a wireless flooding network formed by the plurality of lighting devices, a query requesting lighting device version information;

for each lighting device:
receiving, by the computing device, via the wireless flooding network, a query response from the respective lighting device, the query response indicating a respective lighting device version of the respective lighting device;
determining, by the computing device, whether a site profile includes an indication of the respective lighting device version; and
upon determining that the site profile does not include the indication of the respective lighting device version, adding, by the computing device, the indication of the respective lighting device version to the site profile so as to compile the site profile for all of the lighting devices at a site based upon receipt of the query response from each of the lighting devices such that the compiled site profile includes indications of versions only for different lighting device versions among the lighting devices at the site;
upon compilation of the site profile, sending, by the computing device, to a programming image server, a request for an update of lighting device programming, the request including the site profile indicating the different lighting device versions among the lighting devices at the site;

receiving, by a logic/processing circuitry in the lighting device, from the programming image server via the computing device, the requested update of lighting device programming, the requested update including, each of the indicated lighting device versions of the lighting devices and a corresponding lighting device programming image;
determining one or more of the lighting devices located proximate an update manager; and
delivering, by the logic/processing circuitry, the update of lighting device programming including the lighting device programming images corresponding to the indicated lighting device versions of the lighting devices, to each respective determined lighting device located proximate the update manager.

8. The method of claim 7, wherein each indication of the respective lighting device version includes one or more of:
a hardware version of the lighting device;
a software version of the lighting device;
a hardware version of a component of the lighting device; or
a software version of the lighting device.

9. A lighting device, comprising:
a light source;
a memory;
a wireless communication transceiver; and
logic/processing circuitry coupled to control the light source and coupled to communicate via the transceiver, the logic/processing circuitry configuring the lighting device to:
upon receipt of a query via the wireless communication transceiver and from an update manager, wirelessly transmit a response indicating a respective lighting device version of the lighting device for use in compilation of a site profile identifying different versions of lighting devices at a site, wherein the compiled site profile includes indications of versions only for different lighting device versions among the lighting devices at the site;
upon receipt, via the wireless communication transceiver and from the update manager via another of the lighting devices at the site, of an update of lighting device programming based on the compiled site profile, identify a lighting device programming image included among a plurality of lighting device programming images corresponding to the respective lighting device version of the lighting device from the plurality of lighting device programming images included in the update;
extract the identified lighting device programming image corresponding to the respective lighting device version from the update of lighting device programming;
apply only the extracted lighting device programming image corresponding to the respective lighting device version to operations of the respective lighting device;
identify a number of the other lighting devices located proximate the respective lighting device, as having not received the update of lighting device programming; and
for each respective one of the identified number of proximate lighting devices:
(a) establish a communications connection of the lighting device with the respective identified lighting device; and
(b) deliver, via the established connection, the update of lighting device programming including the plurality of lighting device programming images corresponding to the versions of the lighting devices, to the respective identified lighting device.

10. The lighting device of claim 9, wherein the logic/processing circuitry is configured to:
determine the lighting device had not previously received the query; and
upon determination that the lighting device had not previously received the query, rebroadcast the query via a wireless flooding network formed by the wireless communication transceiver and the another of the lighting devices.

11. The lighting device of claim 9, wherein the logic/processing circuitry configures the lighting device to:
determine the lighting device had previously received the query; and
upon determination that the lighting device had previously received the query, do not rebroadcast the query via a wireless flooding network formed by the wireless communication transceiver and the another of the lighting devices.

12. The lighting device of claim 9, wherein the logic/processing circuitry configures the lighting device to identify the number of proximate lighting devices based on respective received signal strength indicator (RSSI) values such that the identified number of lighting devices includes only one or more lighting devices each having a corresponding RSSI value exceeding a predetermined threshold.

13. A method, comprising steps of:
upon receipt of a query via a wireless communication transceiver of a lighting device and from an update manager, wirelessly transmitting a response indicating a respective lighting device version of the lighting device for use in compilation of a site profile identifying different versions of lighting devices at a site, wherein the compiled site profile includes indications of versions only for different lighting device versions among the lighting devices at the site;
upon receipt, by the wireless communication transceiver of the lighting device and from the update manager via another of the lighting devices at the site of an update of lighting device programming based on the compiled site profile, identifying, by a logic/processing circuitry in the lighting device, a lighting device programming image corresponding to the respective lighting device version of the lighting device from a plurality of lighting device programming images corresponding to versions of the lighting devices included in the update;

extracting, by the logic/processing circuitry, the identified lighting device programming image corresponding to the respective lighting device version from the update of lighting device programming;

applying, by the logic/processing circuitry, only the extracted lighting device programming image corresponding to the respective lighting device version to operations of the lighting device;

identifying, by the logic/processing circuitry, a number of the other lighting devices located proximate the lighting device, as having not received the update of lighting device programming; and for each respective one of the identified number of proximate lighting devices:
(a) establishing, by the logic/processing circuitry, a communications connection of the lighting device with the respective identified lighting device; and
(b) delivering, by the logic/processing circuitry, via the established connection, the update of lighting device programming including the plurality of lighting device programming images corresponding to the versions of the lighting devices, to the respective identified lighting device.

14. The method of claim 13, further comprising:
determining the lighting device had not previously received the query; and
upon determination that the lighting device had not previously received the query, rebroadcasting the query via a wireless flooding network formed by the wireless communication transceiver and the another of the lighting devices.

15. The method of claim 13, further comprising:
determining the lighting device had previously received the query; and
upon determination that the lighting device had previously received the query, not rebroadcasting the query via a wireless flooding network formed by the wireless communication transceiver and the another of the lighting devices.

16. The method of claim 13, wherein the identifying step comprises:
determining a received signal strength indicator (RSSI) value for each of a plurality of the other lighting devices; and
including, in the identified number of lighting devices, only lighting devices having corresponding RSSI values each exceeding a predetermined threshold.

17. A non-transitory computer readable medium comprising program instructions, wherein execution of the program instructions configures a logic/processing circuitry in a lighting device to perform steps comprising:
upon receipt of a query via a wireless communication transceiver of a lighting device and from an update manager, wirelessly transmitting a response indicating a respective lighting device version of the lighting device for use in compilation of a site profile identifying different versions of lighting devices at a site, wherein the compiled site profile includes indications of versions only for different lighting device versions among the lighting devices at the site;

upon receipt, by the wireless communication transceiver of the lighting device and from the update manager via another of the lighting devices at the site of an update of lighting device programming based on the compiled site profile, identifying, by the logic/processing circuitry, a lighting device programming image corresponding to the respective lighting device version of the lighting device from a plurality of lighting device programming images corresponding to versions of the lighting devices included in the update;

extracting, by the logic/processing circuitry, the identified lighting device programming image corresponding to the respective lighting device version from the update of lighting device programming;

applying, by the logic/processing circuitry, only the extracted lighting device programming image corresponding to the respective lighting device version to operations of the lighting device;

identifying, by the logic/processing circuitry, a number of the other lighting devices located proximate the lighting device, as having not received the update of lighting device programming; and for each respective one of the identified number of proximate lighting devices:
(a) establishing, by the logic/processing circuitry, a communications connection of the lighting device with the respective identified lighting device; and
(b) delivering, by the logic/processing circuitry, via the established connection, the update of lighting device programming including the plurality of lighting device programming images corresponding to the versions of the lighting devices, to the respective identified lighting device.

18. A method, comprising:
receiving, by a programming image server and from an update manager, a request for an update of lighting device programming, the request including a site profile comprising indications of a plurality of lighting device versions corresponding to versions only for different versions of lighting devices among a plurality of lighting devices installed at the site;
creating, by the programming image server, the update of lighting device programming, the update including a lighting device programming image corresponding to each indicated lighting device version;
sending, by the programming image server, the update of lighting device programming, including the lighting device programming images corresponding to the indicated versions of the lighting devices at the site, to the update manager;
determining, by the update manager, one or more of the lighting devices located proximate the update manager at the site; and
delivering, from the update manger, the update of lighting device programming including the lighting device programming images corresponding to the indicated versions of the lighting devices at the site, to the determined lighting device located proximate the update manager at the site.

19. The method of claim 18, further comprising:
identifying a number of other lighting devices among the plurality of lighting devices located proximate the determined lighting device, as having not received the update of the lighting device programming; and for each respective one of the identified number of proximate lighting devices:
(a) establishing a communications connection of the determined lighting device with the respective identified lighting device; and
(b) delivering, via the established connection, the update of lighting device programming including the plurality of lighting device programming images corresponding to the indicated versions of the lighting devices, to the respective identified lighting device.

* * * * *